(12) United States Patent
Kabiri et al.

(10) Patent No.: US 11,159,057 B2
(45) Date of Patent: Oct. 26, 2021

(54) LOOP ANTENNAS WITH SELECTIVELY-ACTIVATED FEEDS TO CONTROL PROPAGATION PATTERNS OF WIRELESS POWER SIGNALS

(71) Applicant: Energous Corporation, San Jose, CA (US)

(72) Inventors: Saman Kabiri, Laguna Nigel, CA (US); Evangelos Kornaros, Santa Cruz, CA (US); Alister Hosseini, Phoenix, AZ (US); Michael A. Leabman, San Ramon, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 412 days.

(21) Appl. No.: 16/296,145

(22) Filed: Mar. 7, 2019

(65) Prior Publication Data

US 2019/0288567 A1    Sep. 19, 2019

Related U.S. Application Data

(60) Provisional application No. 62/643,118, filed on Mar. 14, 2018.

(51) Int. Cl.
  *H02J 50/20*   (2016.01)
  *H02J 50/23*   (2016.01)
  (Continued)

(52) U.S. Cl.
  CPC .......... *H02J 50/23* (2016.02); *G06K 19/0715* (2013.01); *H01Q 1/288* (2013.01);
  (Continued)

(58) Field of Classification Search
  CPC .......... H02J 50/005; H02J 50/10; H02J 50/20; H02J 50/23; H02J 50/402; H02J 7/025;
  (Continued)

(56) References Cited

U.S. PATENT DOCUMENTS 3,167,775 A    1/1965   Guertler
3,434,678 A    3/1969   Brown et al.
(Continued)

FOREIGN PATENT DOCUMENTS

CN    102292896 A    12/2011
CN    102860037 A    1/2013
(Continued)

OTHER PUBLICATIONS

Energous Corp. ISRWO, PCT/US2014/037170, Sep. 15, 2014, 11 pgs.

(Continued)

*Primary Examiner* — Richard Isla
*Assistant Examiner* — Johali A Torres Ruiz
(74) *Attorney, Agent, or Firm* — Morgan, Lewis & Bockius LLP

(57) ABSTRACT

An example wireless power transmitter includes: (i) a ground plate, (ii) a conductive wire offset from the ground plate, the conductive wire forming a loop antenna that is configured to radiate an RF signal for wirelessly powering a receiver device, (iii) a plurality of feed elements extending from the ground plate to the conductive wire, each feed element being connected to the conductive wire at a different position on the conductive wire, and (iv) a power amplifier connected to one or more feed elements of the plurality of feed elements. The power amplifier is configured to selectively feed the RF signal to a respective feed element of the one or more feed elements based on a location of the receiver device relative to the plurality of feed elements.

20 Claims, 7 Drawing Sheets
(2 of 7 Drawing Sheet(s) Filed in Color)

(51) Int. Cl.

| | | |
|---|---|---|
| *G06K 19/07* | (2006.01) | |
| *H02J 50/10* | (2016.01) | |
| *H01Q 21/24* | (2006.01) | |
| *H01Q 25/00* | (2006.01) | |
| *H01Q 3/40* | (2006.01) | |
| *H01Q 7/00* | (2006.01) | |
| *H01Q 21/28* | (2006.01) | |
| *H01Q 21/06* | (2006.01) | |
| *H01Q 1/28* | (2006.01) | |
| *H02J 7/02* | (2016.01) | |
| *H01Q 13/10* | (2006.01) | |
| *H01Q 15/00* | (2006.01) | |

(52) U.S. Cl.
CPC ............... *H01Q 3/40* (2013.01); *H01Q 7/00* (2013.01); *H01Q 13/103* (2013.01); *H01Q 15/0086* (2013.01); *H01Q 21/064* (2013.01); *H01Q 21/245* (2013.01); *H01Q 21/28* (2013.01); *H01Q 25/00* (2013.01); *H02J 7/025* (2013.01); *H02J 50/10* (2016.02); *H02J 50/20* (2016.02); *H01Q 21/24* (2013.01)

(58) Field of Classification Search
CPC ............ H01Q 25/00; H01Q 3/40; H01Q 7/00; H01Q 21/064; H01Q 21/24; H01Q 21/245; H01Q 21/28; H01Q 1/288; H01Q 13/103; H01Q 15/0086; G06K 19/0715
See application file for complete search history.

(56) References Cited

U.S. PATENT DOCUMENTS

| | | | |
|---|---|---|---|
| 3,696,384 | A | 10/1972 | Lester |
| 3,754,269 | A | 8/1973 | Clavin |
| 4,101,895 | A | 7/1978 | Jones, Jr. |
| 4,360,741 | A | 11/1982 | Fitzsimmons et al. |
| 4,944,036 | A | 7/1990 | Hyatt |
| 4,995,010 | A | 2/1991 | Knight |
| 5,200,759 | A | 4/1993 | McGinnis |
| 5,211,471 | A | 5/1993 | Rohrs |
| 5,548,292 | A | 8/1996 | Hirshfield et al. |
| 5,556,749 | A | 9/1996 | Mitsuhashi et al. |
| 5,568,088 | A | 10/1996 | Dent et al. |
| 5,646,633 | A | 7/1997 | Dahlberg |
| 5,697,063 | A | 12/1997 | Kishigami et al. |
| 5,712,642 | A | 1/1998 | Hulderman |
| 5,936,527 | A | 8/1999 | Isaacman et al. |
| 5,982,139 | A | 11/1999 | Parise |
| 6,046,708 | A | 4/2000 | MacDonald, Jr. et al. |
| 6,127,799 | A | 10/2000 | Krishnan |
| 6,127,942 | A | 10/2000 | Welle |
| 6,163,296 | A | 12/2000 | Lier et al. |
| 6,271,799 | B1 | 8/2001 | Rief |
| 6,289,237 | B1 | 9/2001 | Mickle et al. |
| 6,329,908 | B1 | 12/2001 | Frecska |
| 6,421,235 | B2 | 7/2002 | Ditzik |
| 6,437,685 | B2 | 8/2002 | Hanaki |
| 6,456,253 | B1 | 9/2002 | Rummeli et al. |
| 6,476,769 | B1 * | 11/2002 | Lehtola .................. H01Q 1/243 343/700 MS |
| 6,476,795 | B1 | 11/2002 | Derocher et al. |
| 6,501,414 | B2 | 12/2002 | Amdt et al. |
| 6,583,723 | B2 | 6/2003 | Watanabe et al. |
| 6,597,897 | B2 | 7/2003 | Tang |
| 6,615,074 | B2 | 9/2003 | Mickle et al. |
| 6,650,376 | B1 | 11/2003 | Obitsu |
| 6,664,920 | B1 | 12/2003 | Mott et al. |
| 6,680,700 | B2 | 1/2004 | Hilgers |
| 6,798,716 | B1 | 9/2004 | Charych |
| 6,803,744 | B1 | 10/2004 | Sabo |
| 6,853,197 | B1 | 2/2005 | McFarland |
| 6,856,291 | B2 | 2/2005 | Mickle et al. |
| 6,911,945 | B2 | 6/2005 | Korva |
| 6,960,968 | B2 | 11/2005 | Odendaal et al. |
| 6,967,462 | B1 | 11/2005 | Landis |
| 6,988,026 | B2 | 1/2006 | Breed et al. |
| 7,003,350 | B2 | 2/2006 | Denker et al. |
| 7,027,311 | B2 | 4/2006 | Vanderelli et al. |
| 7,068,234 | B2 | 6/2006 | Sievenpiper |
| 7,068,991 | B2 | 6/2006 | Parise |
| 7,079,079 | B2 | 7/2006 | Jo et al. |
| 7,183,748 | B1 | 2/2007 | Unno et al. |
| 7,191,013 | B1 | 3/2007 | Miranda et al. |
| 7,193,644 | B2 | 3/2007 | Carter |
| 7,196,663 | B2 | 3/2007 | Bolzer et al. |
| 7,205,749 | B2 | 4/2007 | Hagen et al. |
| 7,215,296 | B2 | 5/2007 | Abramov et al. |
| 7,222,356 | B1 | 5/2007 | Yonezawa et al. |
| 7,274,334 | B2 | 9/2007 | o'Riordan et al. |
| 7,274,336 | B2 | 9/2007 | Carson |
| 7,351,975 | B2 | 4/2008 | Brady et al. |
| 7,359,730 | B2 | 4/2008 | Dennis et al. |
| 7,372,408 | B2 | 5/2008 | Gaucher |
| 7,392,068 | B2 | 6/2008 | Dayan |
| 7,403,803 | B2 | 7/2008 | Mickle et al. |
| 7,443,057 | B2 | 10/2008 | Nunally |
| 7,451,839 | B2 | 11/2008 | Perlman |
| 7,463,201 | B2 | 12/2008 | Chiang et al. |
| 7,471,247 | B2 | 12/2008 | Saily |
| 7,535,195 | B1 | 5/2009 | Horovitz et al. |
| 7,614,556 | B2 | 11/2009 | Overhultz et al. |
| 7,639,994 | B2 | 12/2009 | Greene et al. |
| 7,643,312 | B2 | 1/2010 | Vanderelli et al. |
| 7,652,577 | B1 | 1/2010 | Madhow et al. |
| 7,679,576 | B2 | 3/2010 | Riedel et al. |
| 7,702,771 | B2 | 4/2010 | Ewing et al. |
| 7,786,419 | B2 | 8/2010 | Hyde et al. |
| 7,812,771 | B2 | 10/2010 | Greene et al. |
| 7,830,312 | B2 | 11/2010 | Choudhury et al. |
| 7,844,306 | B2 | 11/2010 | Shearer et al. |
| 7,868,482 | B2 | 1/2011 | Greene et al. |
| 7,898,105 | B2 | 3/2011 | Greene et al. |
| 7,904,117 | B2 | 3/2011 | Doan et al. |
| 7,911,386 | B1 | 3/2011 | Ito et al. |
| 7,925,308 | B2 | 4/2011 | Greene et al. |
| 7,948,208 | B2 | 5/2011 | Partovi et al. |
| 8,055,003 | B2 | 11/2011 | Mittleman et al. |
| 8,070,595 | B2 | 12/2011 | Alderucci et al. |
| 8,072,380 | B2 | 12/2011 | Crouch |
| 8,092,301 | B2 | 1/2012 | Alderucci et al. |
| 8,099,140 | B2 | 1/2012 | Arai |
| 8,115,448 | B2 | 2/2012 | John |
| 8,159,090 | B2 | 4/2012 | Greene et al. |
| 8,159,364 | B2 | 4/2012 | Zeine |
| 8,180,286 | B2 | 5/2012 | Yamasuge |
| 8,228,194 | B2 | 7/2012 | Mickle |
| 8,234,509 | B2 | 7/2012 | Gioscia et al. |
| 8,264,101 | B2 | 9/2012 | Hyde et al. |
| 8,264,291 | B2 | 9/2012 | Morita |
| 8,276,325 | B2 | 10/2012 | Clifton et al. |
| 8,278,784 | B2 | 10/2012 | Cook et al. |
| 8,284,101 | B2 | 10/2012 | Fusco |
| 8,310,201 | B1 | 11/2012 | Wright |
| 8,338,991 | B2 | 12/2012 | Von Novak et al. |
| 8,362,745 | B2 | 1/2013 | Tinaphong |
| 8,380,255 | B2 | 2/2013 | Shearer et al. |
| 8,384,600 | B2 | 2/2013 | Huang et al. |
| 8,410,953 | B2 | 4/2013 | Zeine |
| 8,411,963 | B2 | 4/2013 | Luff |
| 8,432,062 | B2 | 4/2013 | Greene et al. |
| 8,432,071 | B2 | 4/2013 | Huang et al. |
| 8,446,248 | B2 | 5/2013 | Zeine |
| 8,447,234 | B2 | 5/2013 | Cook et al. |
| 8,451,189 | B1 | 5/2013 | Fluhler |
| 8,452,235 | B2 | 5/2013 | Kirby et al. |
| 8,457,656 | B2 | 6/2013 | Perkins et al. |
| 8,461,817 | B2 | 6/2013 | Martin et al. |
| 8,467,733 | B2 | 6/2013 | Leabman |
| 8,497,601 | B2 | 7/2013 | Hall et al. |
| 8,497,658 | B2 | 7/2013 | Von Novak et al. |
| 8,552,597 | B2 | 8/2013 | Song et al. |
| 8,558,661 | B2 | 10/2013 | Zeine |

(56) References Cited

U.S. PATENT DOCUMENTS

| | | |
|---|---|---|
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,843,229 B2 | 12/2017 | Leabman |
| 9,847,669 B2 | 12/2017 | Leabman |
| 9,847,677 B1 | 12/2017 | Leabman |
| 9,853,361 B2 | 12/2017 | Chen et al. |
| 9,853,692 B1 | 12/2017 | Bell et al. |
| 9,866,279 B2 | 1/2018 | Bell et al. |
| 9,867,032 B2 | 1/2018 | Verma et al. |
| 9,871,301 B2 | 1/2018 | Contopanagos |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,887,584 B1 | 2/2018 | Bell et al. |
| 9,893,555 B1 | 2/2018 | Leabman et al. |
| 9,893,564 B2 | 2/2018 | de Rochemont |
| 9,899,844 B1 | 2/2018 | Bell et al. |
| 9,899,861 B1 | 2/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,965,009 B1 | 5/2018 | Bell et al. |
| 9,966,765 B1 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,068,703 B1 | 9/2018 | Contopanagos |
| 10,075,008 B1 | 9/2018 | Bell et al. |
| 10,090,699 B1 | 10/2018 | Leabman |
| 10,090,886 B1 | 10/2018 | Bell et al. |
| 10,103,552 B1 | 10/2018 | Leabman et al. |
| 10,122,219 B1 | 11/2018 | Hosseini et al. |
| 10,124,754 B1 | 11/2018 | Leabman |
| 10,128,686 B1 | 11/2018 | Leabman et al. |
| 10,134,260 B1 | 11/2018 | Bell et al. |
| 10,135,112 B1 | 11/2018 | Hosseini |
| 10,135,294 B1 | 11/2018 | Leabman |
| 10,141,771 B1 | 11/2018 | Hosseini et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman et al. |
| 10,158,259 B1 | 12/2018 | Leabman |
| 10,164,478 B2 | 12/2018 | Leabman |
| 10,170,917 B1 | 1/2019 | Bell et al. |
| 10,186,892 B2 | 1/2019 | Hosseini et al. |
| 10,193,396 B1 | 1/2019 | Bell et al. |
| 10,199,835 B2 | 2/2019 | Bell |
| 10,199,849 B1 | 2/2019 | Bell |
| 10,205,239 B1 | 2/2019 | Contopanagos et al. |
| 10,211,674 B1 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |

(56) References Cited

U.S. PATENT DOCUMENTS

| | | |
|---|---|---|
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,651,670 B1* | 5/2020 | Jiang .................. H02J 50/80 |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258981 A1* | 10/2008 | Achour ............... H01Q 21/065 |
| | | 343/702 |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |

(56) References Cited

U.S. PATENT DOCUMENTS

| | | |
|---|---|---|
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | SzinI |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |

(56) References Cited

U.S. PATENT DOCUMENTS

| | | |
|---|---|---|
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Bauman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212071 A1 | 8/2012 | Myabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |

(56) References Cited

U.S. PATENT DOCUMENTS

| | | |
|---|---|---|
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0197691 A1 | 7/2014 | Wang |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |

(56) References Cited

U.S. PATENT DOCUMENTS

| | | |
|---|---|---|
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0039482 A1 | 2/2015 | Fuinaga |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097442 A1 | 4/2015 | Muurinen |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326051 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326071 A1 | 11/2015 | Contopanagos |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |

(56) References Cited

U.S. PATENT DOCUMENTS

| | | |
|---|---|---|
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204622 A1 | 7/2016 | Leabman |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0187225 A1 | 2/2017 | Hosseini |
| 2017/0063168 A1 | 3/2017 | Uchida |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085112 A1 | 3/2017 | Leabman et al. |
| 2017/0085120 A1 | 3/2017 | Leabman et al. |
| 2017/0085127 A1 | 3/2017 | Leabman |
| 2017/0085437 A1 | 3/2017 | Condeixa et al. |
| 2017/0092115 A1 | 3/2017 | Sloo et al. |
| 2017/0104263 A1 | 4/2017 | Hosseini |
| 2017/0110888 A1 | 4/2017 | Leabman |
| 2017/0110889 A1 | 4/2017 | Bell |
| 2017/0110914 A1 | 4/2017 | Bell |
| 2017/0127196 A1 | 5/2017 | Blum et al. |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0187198 A1 | 6/2017 | Leabman |
| 2017/0187222 A1 | 6/2017 | Hosseini |
| 2017/0187223 A1 | 6/2017 | Hosseini |
| 2017/0187228 A1 | 6/2017 | Hosseini |
| 2017/0187248 A1 | 6/2017 | Leabman |
| 2017/0187422 A1 | 6/2017 | Hosseini |
| 2017/0214422 A1 | 7/2017 | Na et al. |
| 2017/0338695 A1 | 11/2017 | Port |
| 2018/0040929 A1 | 2/2018 | Chappelle |
| 2018/0048178 A1 | 2/2018 | Leabman |
| 2018/0123400 A1 | 5/2018 | Leabman |
| 2018/0131238 A1 | 5/2018 | Leabman |
| 2018/0159338 A1 | 6/2018 | Leabman et al. |
| 2018/0159355 A1 | 6/2018 | Leabman |
| 2018/0166924 A1 | 6/2018 | Hosseini |
| 2018/0166925 A1 | 6/2018 | Hosseini |
| 2018/0198199 A1 | 7/2018 | Hosseini |
| 2018/0212474 A1 | 7/2018 | Hosseini |
| 2018/0226840 A1 | 8/2018 | Leabman |
| 2018/0241255 A1 | 8/2018 | Leabman |
| 2018/0248409 A1 | 8/2018 | Johnston |
| 2018/0262014 A1 | 9/2018 | Bell |
| 2018/0262040 A1 | 9/2018 | Contopanagos |
| 2018/0262060 A1 | 9/2018 | Johnston |
| 2018/0269570 A1 | 9/2018 | Hosseini |
| 2018/0287431 A1 | 10/2018 | Liu et al. |
| 2018/0331429 A1 | 11/2018 | Kornaros |
| 2018/0331581 A1 | 11/2018 | Hosseini |
| 2018/0337534 A1 | 11/2018 | Bell et al. |
| 2018/0375340 A1 | 12/2018 | Bell et al. |
| 2018/0375368 A1 | 12/2018 | Leabman |
| 2018/0376235 A1 | 12/2018 | Leabman |
| 2019/0074133 A1 | 3/2019 | Contopanagos |
| 2019/0229397 A1* | 7/2019 | Rizzo ................ H01Q 1/273 |

FOREIGN PATENT DOCUMENTS

| | | |
|---|---|---|
| CN | 203826555 U | 9/2014 |
| CN | 104090265 A | 10/2014 |
| CN | 103380561 B | 9/2017 |
| DE | 200216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 A2 | 1/2013 |
| EP | 3067983 A1 | 9/2016 |
| EP | 3145052 A1 | 3/2017 |
| GB | 2404497 A | 2/2005 |
| JP | 2002319816 A | 10/2002 |
| JP | 2006157586 A | 6/2006 |
| JP | 2007043432 A | 2/2007 |
| JP | 2008167017 A | 7/2008 |
| JP | 2013162624 A | 8/2013 |
| JP | 2015128349 A | 7/2015 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 9952173 | 10/1999 |
| WO | WO 200111716 A1 | 2/2001 |
| WO | WO 2003091943 A1 | 11/2003 |
| WO | WO 2004077550 A1 | 9/2004 |
| WO | WO 2006122783 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |

(56) References Cited

FOREIGN PATENT DOCUMENTS

| WO | WO 2014209587 A1 | 12/2014 |
|---|---|---|
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

Energous Corp., IPRP, PCT/US2014/037170, Nov. 10, 2015, 8 pgs.
Energous Corp., ISRWO, PCT/US2014/041534, Oct. 13, 2014, 10 pgs.
Energous Corp., IPRP, PCT/US2014/041534, Dec. 29, 2015, 7 pgs.
Energous Corp., ISRWO, PCT/US2014/046956, Nov. 12, 2014, 10 pgs.
Energous Corp., IPRP, PCT/US2014/046956, Jan. 19, 2016, 7 pgs.
Energous Corp., ISRWO, PCT/US2014/037072, Sep. 12, 2014, 8 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 1, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP , PCT/US2014/045237, Jan. 12, 2016, 12 pgs.
Energous Corp., ISRWO , PCT/US2014/054897, Feb. 17, 2015, 10 pgs.
Energous Corp., IPRP , PCT/US2014/054897, Mar. 15, 2016, 8 pgs.
Energous Corp., ISRWO , PCT/US2015/067334, Mar. 3, 2016, 6 pgs.
Energous Corp., IPRP , PCT/US2015/067334, Jul. 4, 2017, 5 pgs.
Energous Corp., ISRWO , PCT/US2014/047963, Nov. 7, 2014, 13 pgs.
Energous Corp., IPRP , PCT/US2014/047963, Jan. 26, 2016, 10 pgs.
Energous Corp., ISRWO , PCT/US2014/054891, Dec. 18, 2014, 12 pgs.
Energous Corp., IPRP , PCT/US2014/054891, Mar. 15, 2016, 10 pgs.
Energous Corp., ISRWO , PCT/US2014/054953, Dec. 4, 2014, 7 pgs.
Energous Corp., IPRP , PCT/US2014/054953, Mar. 22, 2016, 5 pgs.
Energous Corp., ISRWO , PCT/US2015/067294, Mar. 29, 2016, 7 pgs.
Energous Corp., IPRP , PCT/US2015/067294, Jul. 4, 2017, 6 pgs.
Energous Corp., ISRWO , PCT/US2014/062672 Jan. 26, 2015, 11 pgs.

(56) References Cited

OTHER PUBLICATIONS

Energous Corp., IPRP, PCT/US2014/062672 May 10, 2016, 8 pgs.
Energous Corp., ISRWO, PCT/US2016/069313 Nov. 13, 2017, 10 pgs.
Energous Corp., IPRP, PCT/US2016/069313 Jul. 3, 2018, 7 pgs.
Energous Corp., ISRWO, PCT/US2014/044810 Oct. 21, 2014, 12 pgs.
Energous Corp., IPRP, PCT/US2014/044810, Jan. 5, 2016, 10 pgs.
Energous Corp., ISRWO, PCT/US2015/067271, Mar. 11, 2016, 6 pgs.
Energous Corp., IPRP, PCT/US2015/067271, Jul. 4, 2017, 5 pgs.
Energous Corp., ISRWO, PCT/US2014/040648, Oct. 10, 2014, 11 pgs.
Energous Corp., IPRP, PCT/US2014/040648, Dec. 8, 2015, 8 pgs.
Energous Corp., ISRWO, PCT/US2014/049673, Nov. 18, 2014, 10 pgs.
Energous Corp., IPRP, PCT/US2014/049673, Feb. 9, 2016, 6 pgs.
Energous Corp., ISRWO, PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., IPRP, PCT/US2016/068504, Jun. 26, 2018, 5 pgs.
Energous Corp., ISRWO, PCT/US2016/068495, Mar. 30, 2017, 9 pgs.
Energous Corp., IPRP, PCT/US2016/068495, Jun. 26, 2018, 7 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., IPRP, PCT/US2016/068551, Jun. 26, 2018, 6 pgs.
Energous Corp., ISRWO, PCT/US2016/068498, May 17, 2017, 8 pgs.
Energous Corp., IPRP, PCT/US2016/068498, Jun. 26, 2018, 6 pgs.
Energous Corp., ISRWO, PCT/US2016/068993, Mar. 13, 2017, 12 pgs.
Energous Corp., IPRP, PCT/US2016/068993, Jul. 3, 2018, 10 pgs.
Energous Corp., ISRWO, PCT/US2016/068565, Mar. 8, 2017, 11 pgs.
Energous Corp., IPRP, PCT/US2016/068565, Jun. 26, 2018, 9 pgs.
Energous Corp., ISRWO, PCT/US2016/068987, May 8, 2017, 10 pgs.
Energous Corp., IPRP, PCT/US2016/068987, Jul. 3, 2018, 7 pgs.
Energous Corp., ISRWO, PCT/US2016/069316, Mar. 16, 2017, 15 pgs.
Energous Corp., IPRP, PCT/US2016/069316, Jul. 3, 2018, 12 pgs.
Energous Corp., ISRWO, PCT/US2018/012806, Mar. 23, 2018, 9 pgs.
Energous Corp., ISRWO, PCT/US2017/046800, Sep. 11, 2017, 13 pgs.
Energous Corp., IPRP, PCT/US2017/046800, Feb. 12, 2019, 10 pgs.
Energous Corp., ISRWO, PCT/US2017/065886, Apr. 6, 2018, 13 pgs.
Energous Corp., ISRWO, PCT/US2018/031768, Jul. 3, 2018, 9 pgs.
Energous Corp., ISRWO, PCT/US2018/0351082, Dec. 12, 2018, 9 pgs.
Energous Corp., ISRWO, PCT/US2018/064289, Mar. 28, 2019, 14 pgs.
Order Granting Reexamination Request Control No. 90013793 Aug. 31, 2016, 23 pgs.
Ossia Inc. vs Energous Corp., PGR2016-00023-Institution Decision, Nov. 29, 2016, 29 pgs.
Ossia Inc. vs Energous Corp., PGR2016-00024-Institution Decision, Nov. 29, 2016, 50 pgs.
Ossia Inc. vs Energous Corp., PGR2016-00024-Judgement-Adverse, Jan. 20, 2017, 3 pgs.
ReExam Ordered Control No. 90013793 Feb. 2, 2017, 8 pgs.
Ossia Inc. vs Energous Corp., Declaration of Stephen B. Heppe in Support of Petition for Post-Grant Review of U.S. Pat. No. 9,124,125, PGR2016-00024, May 31, 2016, 122 pgs.
Ossia Inc. vs Energous Corp., Petition for Post-Grant Review of U.S. Pat. No. 9,124,125, May 31, 2016, 92 pgs.
Ossia Inc. vs Energous Corp., Patent Owner Preliminary Response, dated Sep. 8, 2016, 95 pgs.
Ossia Inc. vs Energous Corp., Petition for Post Grant Review of U.S. Pat. No. 9,124,125, May 31, 2016, 86 pgs.
Ossia Inc. vs Energous Corp., Declaration of Stephen B. Heppe in Support of Petition for Post-Grant Review of U.S. Pat. No. 9,124,125, PGR2016-00023, May 31, 2016, 144 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 1, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
European Search Report. EP15876036, dated May 3, 2018, 8 pgs.
Supplemental European Search Report. EP15874273.4, dated May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.
Extended European Search Report. EP18204043.6, dated Feb. 14, 2019, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultra-wideband retro-reflective beamforming" 2010 IEEE Antennas and Propagation Society International Symposium, Toronto, ON 2010, pp. 1-4.

(56) References Cited

OTHER PUBLICATIONS

Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.

Smolders—Institute of Electrical 1-15 and Electronics Engineers: "Broadband microstrip array antennas" Digest of the Antennas and Propagation Society International Symposium. Seattle, WA Jun. 19-24, 1994. Abstract 3 pgs.

Paolo Nenzi et al; "U-Helix: On-chip short conical antenna", 2013 7th European Conference on Antennas and Propagation (EUCAP), ISBN:978-1-4673-2187-7, IEEE, Apr. 8, 2013, 5 pgs.

Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.

Mascarenas et al.; "Experimental Studies of Using Wireless Energy Transmission for Powering Embedded Sensor Nodes." Nov. 28, 2009, Journal of Sound and Vibration, pp. 2421-2433.

Li et al. High-Efficiency Switching-Mode Charger System Design Considerations with Dynamic Power Path Management, Mar./Apr. 2012 Issue, 8 pgs.

Energous Corp., ISRWO, PCT/US2019/021817, Apr. 6, 2019, 11 pgs.

Energous Corp., IPRP, PCT/US2019/021817, Sep. 15, 2020, 7 pgs.

\* cited by examiner

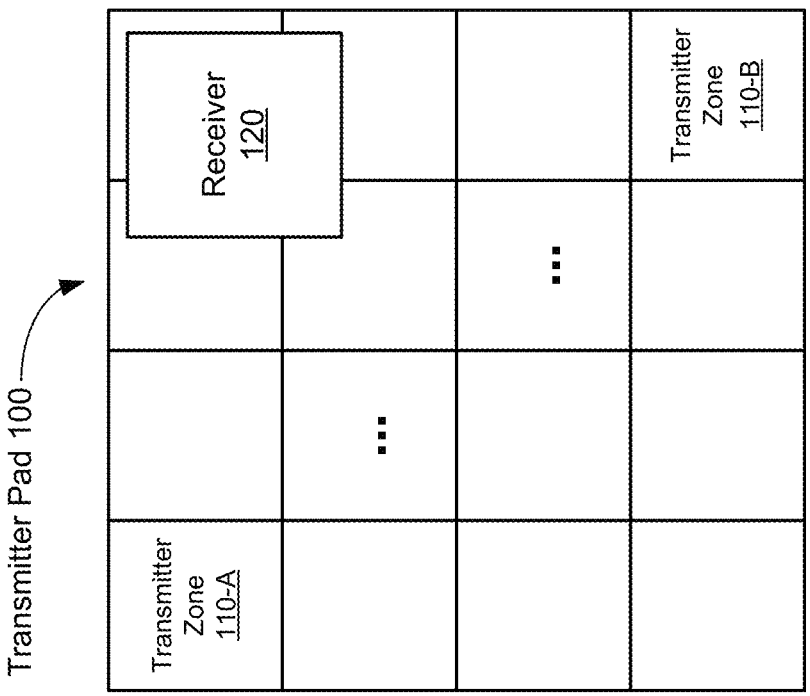
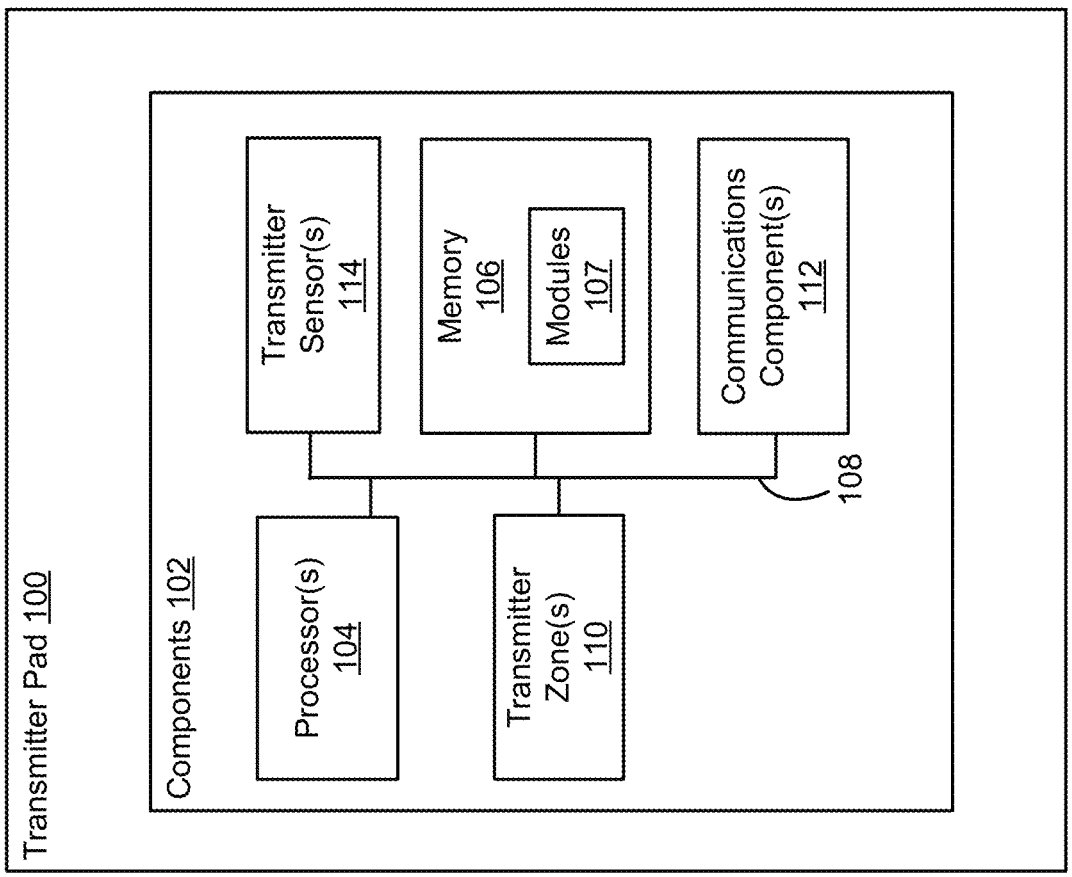
FIGURE 1B
FIGURE 1A

400

```
┌─────────────────────────────────────────────────────────────────┐
│ Provide a wireless power transmitter comprising: (i) a ground   │
│ plate, (ii) a conductive wire offset from the ground plate, the │
│ conductive wire forming a loop antenna, (iii) a plurality of    │──402
│ feed elements extending from the ground plate to the conductive │
│ wire, each feed element being connected to the conductive wire  │
│ at a different position on the conductive wire, and (iv) a      │
│ power amplifier connected to one or more feed elements of the   │
│ plurality of feed elements                                      │
└─────────────────────────────────────────────────────────────────┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐──404
│ Select a respective feed element of the one or more feed        │
│ elements based on a location of a receiver device relative to   │
│ the plurality of feed elements                                  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                 │
                                 ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┐──406
│ Send an instruction to the power amplifier that causes the      │
│ power amplifier to feed an RF signal to the respective feed     │
│ element                                                         │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─┘
                                 │
                                 ▼
┌─────────────────────────────────────────────────────────────────┐
│ Selectively feed, by the power amplifier, the RF signal to the  │──408
│ respective feed of the one or more feed elements based on the   │
│ location of the receiver device relative to the plurality of    │
│ feed elements                                                   │
└─────────────────────────────────────────────────────────────────┘
                                 │
                                 ▼
┌─────────────────────────────────────────────────────────────────┐
│ Excite, by the respective feed element fed by the power         │──410
│ amplifier, the conductive wire                                  │
└─────────────────────────────────────────────────────────────────┘
                                 │
                                 ▼
┌─────────────────────────────────────────────────────────────────┐
│ Radiate, by the conductive wire, the RF signal for wirelessly   │──412
│ powering the receiver device                                    │
└─────────────────────────────────────────────────────────────────┘
```

FIGURE 4

LOOP ANTENNAS WITH SELECTIVELY-ACTIVATED FEEDS TO CONTROL PROPAGATION PATTERNS OF WIRELESS POWER SIGNALS

RELATED APPLICATION

This application claims priority to U.S. Provisional Patent Application No. 62/643,118, filed Mar. 14, 2018, entitled "Loop Antennas With Selectively-Activated Feeds To Control Propagation Patterns of Wireless Power Signals," which is hereby incorporated by reference in its entirety.

TECHNICAL FIELD

The present disclosure relates generally to loop antennas for wireless power transmission, and more particularly to loop antennas with selectively-activated feeds to control propagation patterns of wireless power signals.

BACKGROUND

Portable electronic devices such as smartphones, tablets, notebooks and other electronic devices have become a necessity for communicating and interacting with others. The frequent use of portable electronic devices, however, uses a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device due to magnetic coupling between respective coils in the inductive pad and in the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required magnetic coupling to occur. Additionally, placement of other metallic objects near an inductive charging pad may interfere with operation of the inductive charging pad, so even if the user places their device at the exact right position, if another metal object is also on the pad, then magnetic coupling still may not occur and the device will not be charged by the inductive charging pad. This results in a frustrating experience for many users as they may be unable to properly charge their devices.

Charging using electromagnetic radiation (e.g., microwave radiation waves) offers promise, but RF charging is typically focused on far-field charging and not near-field or mid-field charging where the device to be charged is placed on or near the RF energy transmitter.

SUMMARY

Accordingly, there is a need for a wireless charging solution that (i) radiates energy at a mid-field distance (and various other distances) to wirelessly deliver power to a receiver, and (ii) allows users to place their devices at any position on or near the pad and still receive wirelessly delivered energy. A method of operating one such example wireless power transmitter is described below.

In the following description, references to "mid-field" transmission refer to radiation of electromagnetic waves by an antenna (e.g., the loop antenna described herein) for distances up to approximately a wavelength of an operating frequency of the antenna (e.g., a wavelength of an operating frequency of 5.8 GHz is approximately 5.17 centimeters, so the mid-field transmission distance of the antenna in this example would be approximately 5.17 centimeters). In some embodiments, the operating frequency ranges from 400 MHz to 60 GHz. For the purposes of the following description, a mid-field charging pad (or mid-field radio-frequency charging pad) is a wireless-power-transmitting device that includes one or more wireless power transmitters, each of which is configured to radiate electromagnetic waves to receiver devices that are located within a mid-field distance of the charging pad (e.g., within 0-5.17 centimeters of the charging pad, if the one or more wireless power transmitters of the charging pad are using an operating frequency of 5.8 GHz).

(A1) In some embodiments, a method of wirelessly charging a receiver device includes, providing a wireless power transmitter including (i) a ground plate, (ii) a conductive wire offset from the ground plate, the conductive wire forming a loop antenna, (iii) a plurality of feed elements extending from the ground plate to the conductive wire, each feed element being connected to the conductive wire at a different position on the conductive wire, and (iv) a power amplifier connected to one or more feed elements of the plurality of feed elements. The method further includes selectively feeding, by the power amplifier, an RF signal to a respective feed element of the one or more feed elements based on a location of a receiver device relative to the plurality of feed elements. The method further includes (i) exciting, by the respective feed element fed by the power amplifier, the conductive wire, and (ii) radiating, by the conductive wire, the RF signal for wirelessly powering the receiver device.

(A2) In some embodiments of the method of A1, the method further includes: (i) selecting, by a controller of the wireless power transmitter, the respective feed element of the one or more feed elements based on the location of the receiver device relative to the plurality of feed elements, and (ii) sending, by the controller, an instruction to the power amplifier that causes the power amplifier to feed the RF signal to the respective feed element.

(A3) In some embodiments of the method of A2, the method further includes receiving, by a communications radio of the wireless power transmitter, a communications signal from a corresponding communications radio of the receiver device. Moreover, the method further includes determining, by the controller, the location of the receiver device relative to the plurality of feed elements based, at least in part, on the communications signal. In some embodiments, the operations of A3 are performed prior to the operations of A2.

(A4) In some embodiments of the method of any of A2-A3, the method further includes detecting, by one or more sensors of the wireless power transmitter, a presence of the receiver device. Moreover, the method further includes determining, by the controller, the location of the receiver device relative to the plurality of feed elements based on information generated by the one or more sensors. In some embodiments, determining the location of the receiver device relative to the plurality of feed elements is based on a combination of the communications signal and the information generated by the one or more sensors. In some embodiments, the operations of A4 are performed prior to the operations of A2.

(A5) In some embodiments of the method of any of A1-A4, radiating the RF signal includes radiating the RF signal from the conductive wire with different propagation patterns (e.g., radiation patterns) depending on which of the plurality of feed elements is fed by the power amplifier.

(A6) In some embodiments of the method of A5, the RF signal is radiated from the conductive wire with the different propagation patterns, wherein the different propagation patterns are based, at least in part, on a plurality of physical dimensions of the wireless power transmitter, including: a width of the conductive wire; a length of the conductive wire; a thickness of the conductive wire; a diameter of the conductive wire; a shape of the loop; and a magnitude of the offset between the ground plate and the conductive wire.

(A7) In some embodiments of the method of any of A5-A6, when the respective feed element is a first feed element of the one or more feed elements that is connected to the conductive wire at a first position, the method further includes feeding, via the power amplifier, the RF signal to the first feed element when the location of the receiver device is within a first threshold distance from the first position.

(A8) In some embodiments of the method of A7, radiating the RF signal includes radiating the RF signal from the conductive wire in a first propagation pattern of the different propagation patterns when the first feed element of the one or more feed elements is fed by the power amplifier, where a high concentration of RF energy in the first propagation pattern is steered to travel towards the location of the receiver device.

(A9) In some embodiments of the method of any of A5-A8, when the respective feed element is a second feed element, distinct from the first feed element, of the one or more feed elements that is connected to the conductive wire at a second position, distinct from the first position, the method further includes feeding, via the power amplifier, the RF signal to the second feed element when the receiver device is located at a second location, distinct from the location, the second location being within a second threshold distance from the second position.

(A10) In some embodiments of the method of A9, radiating the RF signal includes radiating the RF signal in a second propagation pattern of the different propagation patterns when the second feed element of the one or more feed elements is fed by the power amplifier, where a high concentration of RF energy in the second propagation pattern is steered to travel towards the second location of the receiver device.

(A11) In some embodiments of the method of A10, the RF signal radiated in the first propagation pattern propagates away from the first position in a first direction towards the location of the receiver device, and the RF signal radiated in the second propagation pattern propagates away from the second position in a second direction towards the second location of the receiver device. In some embodiments, the second direction is different from the first direction. In some embodiments, the second direction is the same as the first direction.

(A12) In some embodiments of the method of any of A8-A11, the first propagation pattern has a first polarization and the second propagation pattern has a second polarization. In some embodiments, the second polarization differs from the first polarization. In some embodiments, the second polarization is the same as the first polarization.

(A13) In some embodiments of the method of any of A1-A12, the ground plate is disposed in a first plane, the conductive wire is disposed in a second plane, and the second plane is substantially parallel to the first plane.

(A14) In some embodiments of the method of A13, the second plane is offset from the first plane by a distance.

(A15) In some embodiments of the method of any of A13-A14, each of the plurality of feed elements is substantially perpendicular to the first and second planes.

(A16) In some embodiments of the method of any of A1-A15, the one or more feed elements are one or more first feed elements, and the wireless power transmitter further includes a second power amplifier connected to one or more second feed elements of the plurality of feed elements.

(A17) In some embodiments of the method of any of A1-A16, the one or more feed elements includes at least two feed elements, and feeding the RF signal includes feeding the RF signal to the at least two feed elements upon determining that the location of the receiver device is between the two feed elements.

(A18) In some embodiments of the method of any of A1-A17, the conductive wire includes a plurality of contiguous segments and each of the plurality of feed elements is positioned between a respective pair of segments of the plurality of contiguous segments.

(A19) In some embodiments of the method of claim A18, one or more first segments of the plurality of contiguous segments have a first shape and one or more second segments of the plurality of contiguous segments have a second shape different from the first shape.

(A20) In some embodiments of the method of any of A11-A19, further including radiating, via one or more (or each) of the plurality of contiguous segments, the RF signal when one of the plurality of feed elements is fed by the power amplifier.

(A21) In some embodiments of the method of any of A1-A20, the plurality of feed elements is configured to provide the RF signal to the conductive wire at the different positions.

(A22) In some embodiments of the method of any of A1-A21, the RF signal is transmitted at a frequency of 5.8 GHz, 2.4 GHz, or 900 MHz.

(A23) In some embodiments of the method of any of A7 and A9, the RF signal has a wavelength, the first and second threshold distances are within a mid-field transmission distance of the wireless power transmitter, and the mid-field transmission distance is within the wavelength of the RF signal from the wireless power transmitter.

(A24) In one other aspect, a wireless power transmitter is provided, and the wireless power transmitter includes the structural characteristics for a wireless power transmitter described above in any of A1-A22, and the wireless power transmitter is also configured to perform the method steps described above in any of A1-A23.

(A25) In another aspect, a transmitter pad that includes one or more of the wireless power transmitters described in any of A1-A23 is provided. In some embodiments, the transmitter pad is in communication with one or more processors and memory storing one or more programs which, when executed by the one or more processors, cause the transmitter pad to perform the method described in any one of A1-A23.

(A26) In yet another aspect, a transmitter pad (that includes one or more of the wireless power transmitters described in any of A1-A23) is provided and the transmitter pad includes means for performing the method described in any of A1-A23.

(A27) In still another aspect, a non-transitory computer-readable storage medium is provided (e.g., as a memory device, such as external or internal storage, that is in communication with a transmitter pad). The non-transitory computer-readable storage medium stores executable instructions that, when executed by a transmitter pad (that includes a plurality of wireless power transmitters) with one or more processors/cores, cause the transmitter pad to perform the method described in any one of A1-A23.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 1A-1B show diagrams illustrating a representative transmitter pad in accordance with some embodiments.

FIG. 4 is a flow diagram showing a method of wirelessly charging a receiver device in accordance with some embodiments.

Figure 2:
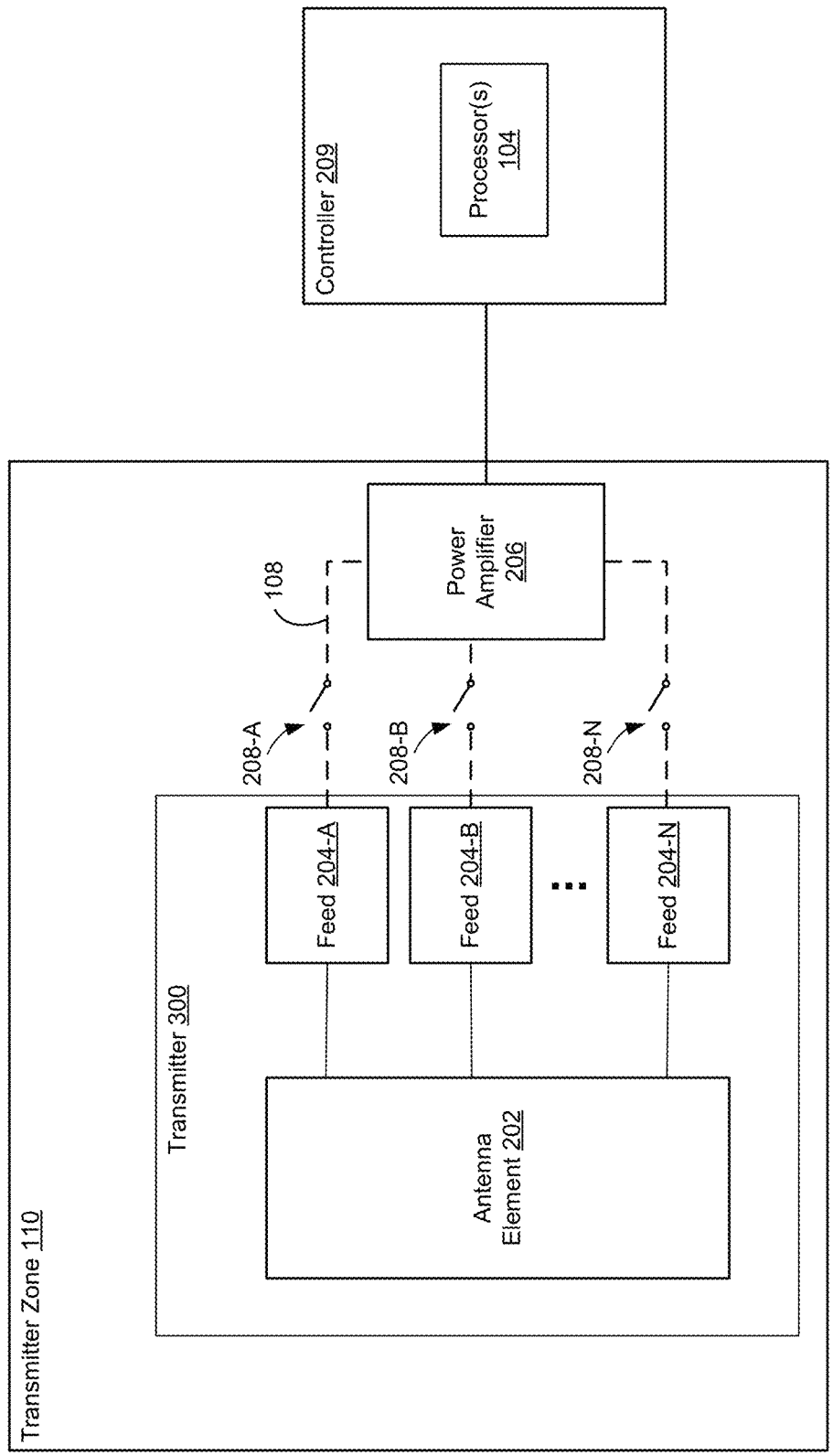
FIG. 2 is a schematic of a representative transmitter in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

FIG. 1A is a high-level block diagram of a transmitter pad 100, in accordance with some embodiments. The transmitter pad 100 (also referred to interchangeably herein as a mid-field radio-frequency (RF) charging pad, mid-field charging pad, or radio-frequency charging pad) includes components 102. The transmitter pad 100 is configured to generate electromagnetic energy (e.g., RF power transmission waves/RF signals) that is received by a receiver that is placed in proximity (e.g., within a mid-field distance, such as approximately 12.5 centimeters from the transmitter pad 100 if the wireless power transmitters of the pad are currently using an operation frequency of 2.4 GHz) or on top of the transmitter pad 100. the descriptions herein, RF power transmission waves are used as a primary illustrative example, but one or ordinary skill in the art will appreciate in view of these descriptions that any type of electromagnetic radiation waves may be used instead in certain embodiments or implementations.

Figure 3A:
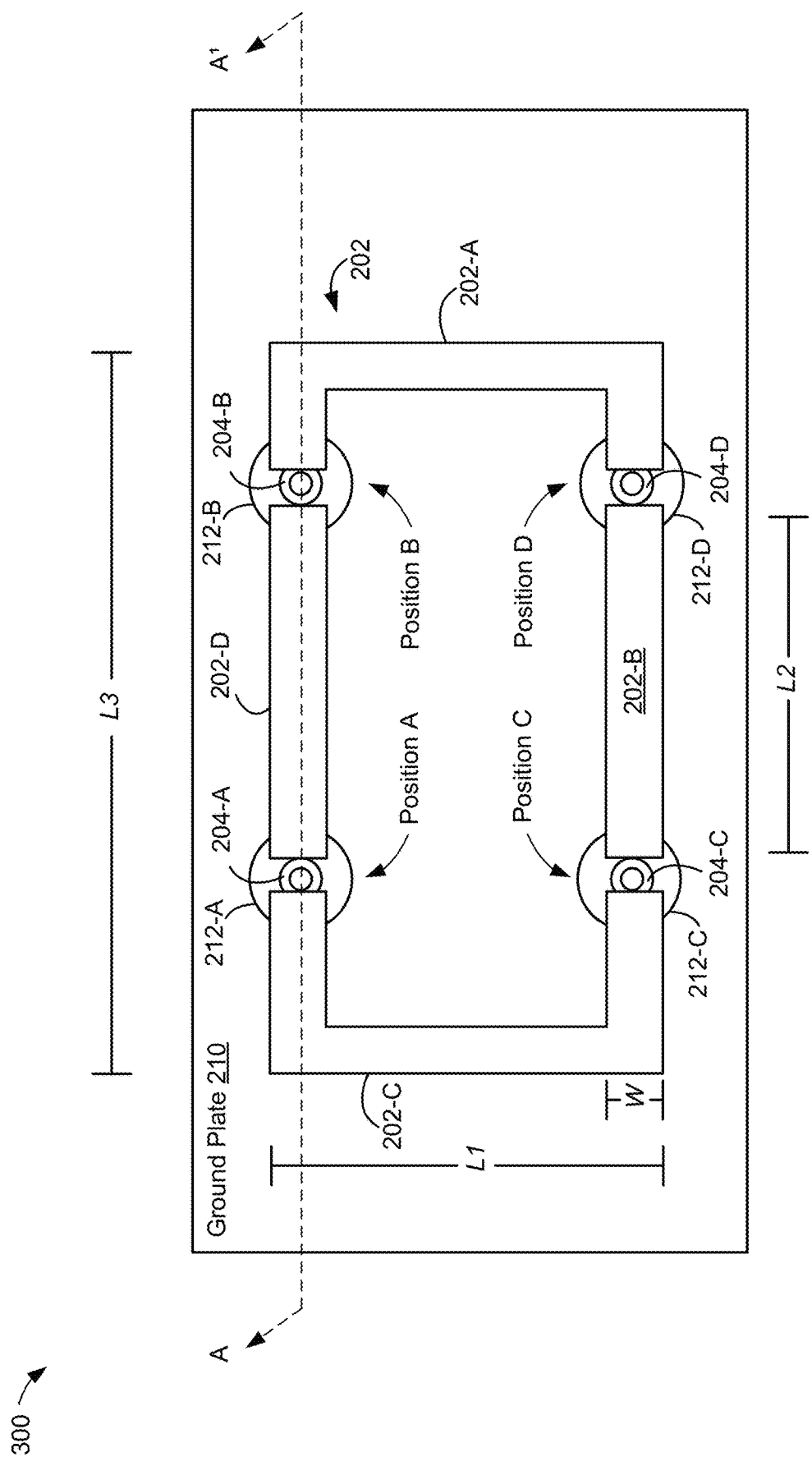
FIG. 3A is a top view of a representative wireless power transmitter in accordance with some embodiments.
Figure 3B:
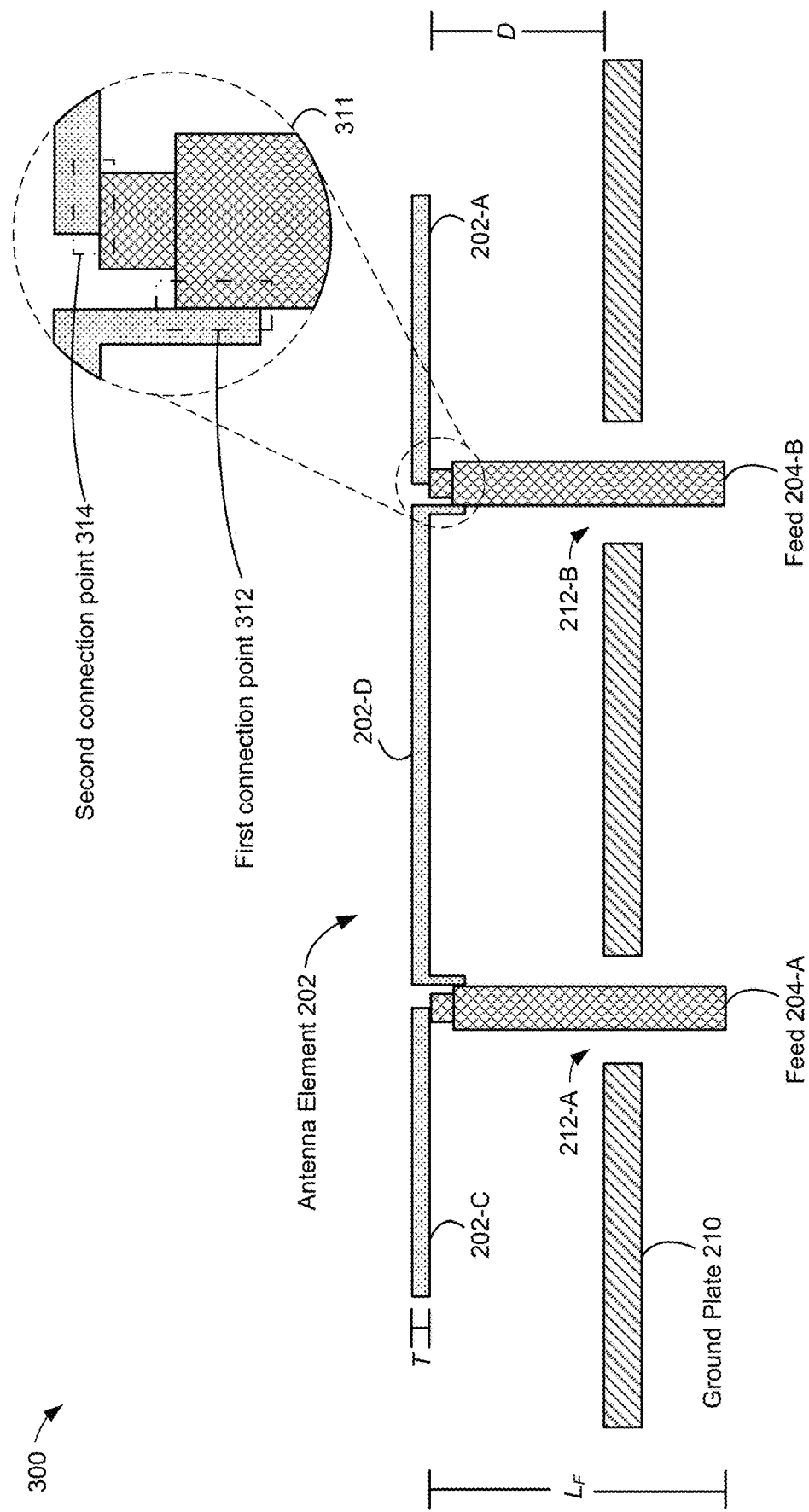
FIG. 3B is a cross-sectional view (taken along line A-A$^1$) of the representative wireless power transmitter of FIG. 3A in accordance with some embodiments.

The components 102 of the transmitter pad 100 include, for example, one or more processors/cores 104, a memory 106, one or more transmitter zones 110 (each including respective one or more wireless power transmitters 300, and an example transmitter 300 is illustrated in FIGS. 3A-3B), one or more communications components 112, and/or one or more transmitter sensors 114. In some embodiments, these components 102 are interconnected by way of a communications bus 108. In some embodiments, the components 102 are housed within the transmitter pad 100. Alternatively, in some embodiments, one or more of the components 102 are disposed outside (e.g., external) the transmitter pad 100. For example, the one or more processors 104, the memory 106, the one or more communications components 112, may be external while the respective one or more transmitters 300 of each respective transmitter zone 100 and the one or more transmitter sensors 114 may be internal (or some other combination/arrangement of components).

In some embodiments, the communication component(s) 112 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

In some embodiments, the communications component 112 transmits communication signals to the receiver 120 by way of the electronic device. For example, the communications component 112 may convey information to a communications component of the electronic device, which the electronic device may in turn convey to the receiver 120 (e.g., via a bus).

In some embodiments, the receiver 120 includes a communications component configured to communicate various types of data with the transmitter pad 100, through a respective communication signal generated by a receiver-side communications component. The data may include location indicators for the receiver 120, a power status of the electronic device, status information for the receiver 120 (e.g., a frequency at which a wireless-power-receiving antenna of the receiver 120 is tuned, a polarization of the wireless-power-receiving antenna, etc.), status information for the electronic device (e.g., a current battery-charge level for the electronic device), status information about power waves being transmitted to the receiver 120 by the pad 100 (e.g., an amount of energy the receiver 120 is able to extract from the power waves).

In some embodiments, the data contained within communication signals is used by the electronic device, receiver 120, and/or transmitter pad 100 for determining adjustments of one or more characteristics used by any of the transmitters 300 to transmit power waves. Using a communication signal, the transmitter pad 100 receives data that is used, e.g., to identify receivers 120 on the transmitter pad 100, identify electronic devices, determine safe and effective waveform characteristics for power waves, and/or determine which feed to activate for one or more of the transmitters 300.

In some embodiments, the transmitter pad 100 is designed to lay flat on a surface (e.g., horizontally) while in some embodiments the transmitter pad 100 is designed to be positioned at an angle relative to the surface (e.g., substantially vertical). In some embodiments, a housing for the transmitter pad 100 is shaped such that the transmitter pad 100 is stable when positioned in a substantially vertical manner. Moreover, the transmitter pad 100 may include a stand (e.g., kick stand) that extends away from the transmitter pad 100 to provide additional support.

In some embodiments, the one or more transmitter sensors 114 are positioned at one or more locations on the transmitter pad 100 (e.g., not specific to any transmitter zone 110). Alternatively, in some embodiments, a first set sensors of the one or more sensors 114 is part of a first transmitter zone 110-A, a second set sensors of the one or more sensors 114 is part of a second transmitter zone 110-B, and so on. In such an arrangement, the various sets of sensors provide respective sensor information to the one or more processors 104, and the one or more processors 104 use the sensor information to determine a location of the receiver 120 relative to the one or more transmitter zones 110.

Non-limiting examples of transmitter sensors 114 include, e.g., infrared, pyroelectric, ultrasonic, laser, optical, Doppler, gyro, accelerometer, microwave, millimeter, RF standing-wave sensors, resonant LC sensors, capacitive sensors, light sensor, and/or inductive sensors, and a hall sensor. In some embodiments, technologies for transmitter sensor(s) 114 include binary sensors that acquire stereoscopic sensor data, such as the location of a human or other sensitive object.

In some embodiments, memory 106 of the transmitter pad 100 stores one or more programs (e.g., sets of instructions) and/or data structures, collectively referred to herein as "modules." In some embodiments, memory 106, or the non-transitory computer readable storage medium of memory 106 stores the following modules 107 (e.g., programs and/or data structures), or a subset or superset thereof:

information received from receiver 120 (e.g., generated by a sensor of the receiver 120 and then transmitted to the transmitter pad 100, or generated by a communications component of the receiver 120 (or the electronic device coupled thereto) and then transmitted to the transmitter pad 100);

information received from transmitter sensor(s) 114;

RF power transmission signals generation module for generating and transmitting (e.g., in conjunction with respective transmitter(s) 300) RF power transmission signals; and/or a characteristic selection module for selecting waveform characteristics of the RF power transmission signals.

The above-identified modules (e.g., data structures and/or programs including sets of instructions) need not be implemented as separate software programs, procedures, or modules, and thus various subsets of these modules may be combined or otherwise re-arranged in various embodiments. In some embodiments, memory 106 stores a subset of the modules identified above. Furthermore, the memory 106 may store additional modules not described above. In some embodiments, the modules stored in memory 106, or a non-transitory computer readable storage medium of memory 106, provide instructions for implementing respective operations in the methods described below. In some embodiments, some or all of these modules may be implemented with specialized hardware circuits that subsume part or all of the module functionality. One or more of the above-identified elements may be executed by one or more of the processor(s) 104. In some embodiments, one or more of the modules described with regard to memory 106 is implemented on memory of a server (not shown) that is communicatively coupled to the transmitter pad 100 and/or by a memory of electronic device and/or receiver 120. In addition, memory 106 may store other information such as certain thresholds and criteria, as well as identifiers of certain receivers.

Turning to FIG. 1B, a simplified top view of the transmitter pad 100 is illustrated. FIG. 1B shows a receiver 120 (e.g., a receiver that is internally or externally coupled to an electronic device) that is placed on top of the transmitter pad 100 and then receives energy from one or more of the transmitters 300. In some embodiments, the receiver 120 includes one or more antennas for receiving energy (e.g., RF signals) from the transmitter pad 100 and a communications component for receiving communications (or sending communications) sent by the transmitter pad 100. The communications component of the receiver 120 may also include hardware capable of data communications using the variety of wireless protocols listed above with reference to the communication component(s) 112.

The receiver 120 converts energy from received signals (also referred to herein as RF power transmission signals, or simply, RF signals, power waves, or power transmission signals) into electrical energy to power and/or charge an electronic device coupled to the receiver 120. For example, the receiver 120 uses power-conversion circuitry to convert captured energy from power waves (received via a wireless-power-receiver antenna) to alternating current (AC) electricity or direct current (DC) electricity usable to power and/or charge an electronic device. Non-limiting examples of power-conversion circuitry can include rectifiers, rectifying circuits, voltage conditioners, among suitable circuitry and devices.

In some embodiments, the receiver 120 is a standalone device that is detachably coupled to one or more electronic devices. For example, the electronic device has processor(s) for controlling one or more functions of the electronic device and the receiver 120 has processor(s) for controlling one or more functions of the receiver 120. In some embodiments, the receiver 120 is a component of the electronic device. For example, processor(s) of the electronic device control functions of the electronic device and the receiver 120. In addition, in some embodiments, the receiver 120 includes processor(s) which communicate with processor(s) of the electronic device. It is noted that the combination of the receiver 120 and the electronic device is sometimes referred to herein simply as a "receiver device."

In some embodiments, the receiver 120 receives one or more power waves directly from the transmitter pad 100 (and in particular, from one or more of the transmitter(s) 300). In some embodiments, the receiver 120 harvests power from one or more power waves transmitted by transmitter pad 100. As will be discussed in greater detail below, the one or more power waves are generated at one or more different positions along a respective conductive wire 202-A of a respective transmitter 300 that is positioned within a respective transmitter zone 110, and the generated one or more power waves propagate away from the respective transmitter 300 in a particular pattern. In some embodiments, the transmitter pad 100 is a mid-field transmitter that transmits the one or more power waves within a mid-field distance of its charging surface.

In some embodiments, after energy is harvested from the one or more power waves (as discussed in greater detail below), circuitry (e.g., integrated circuits, amplifiers, rectifiers, and/or voltage conditioner) of the receiver 120 converts the energy to usable power (i.e., electricity), which powers the electronic device associated with the receiver 120 (and/or the usable power is stored in a battery of electronic device). In some embodiments, a rectifying circuit of the receiver 120 converts the electrical energy from AC to DC for use by the electronic device. In some embodiments, a voltage conditioning circuit increases or decreases the voltage of the electrical energy as required by the electronic device, and may produce a constant voltage for providing electricity in a form required by the electronic device.

In some embodiments, a plurality of electronic devices may be positioned on a surface of the transmitter pad 100, each having at least one respective receiver 120 that is used to receive power waves from the transmitter pad 100. In some embodiments, the transmitter pad 100 adjusts one or more characteristics (e.g., waveform characteristics, such as phase, gain, amplitude, frequency, etc.) of the power waves and controls which feeds of respective transmitters 110 are activated to controllably form propagation patterns of radio-frequency energy transmitter to each of the respective receivers 120.

In some embodiments, the one or more transmitter zones 110 cover all or a portion of a surface area of the transmitter pad 100. The transmitter zones 110 may also form a top surface (i.e., a charging surface) of the transmitter pad 100. Further, in some embodiments, the one or more transmitter zones 110 and other components 102 of the transmitter pad 100 may be encapsulated within a plastic or other type of covering (e.g., a housing).

In some embodiments, circuits (not shown) of the transmitter pad 100, such as a controller circuit and/or waveform generator, may at least partially control the behavior of the transmitters 110. For example, based on the information received from the receiver 120 by way of a communication signal (or data gathered by transmitter sensor(s) 114), a controller circuit (e.g., controller 209, FIG. 2) may determine a set of one or more waveform characteristics (e.g., amplitude, frequency, direction, phase, among other characteristics) used for transmitting the power waves that would effectively provide power to the receiver 120. The controller circuit may also identify one or more transmitter zones 110 (and transmitters 300 included therein) that would be effective in transmitting the power waves (e.g., receiver 120 may be positioned between two transmitter zones 110, and in such a case, respective transmitters 300 positioned within two transmitter zones 110 may be activated). Upon identifying the one or more transmitter zones 110 and/or particular transmitters 300 positioned therein, the controller circuit may also select a respective feed element of one or more feed elements (e.g., one of the plurality of feed elements 204-A-204-D, FIG. 2) from each of the transmitters 300 based on a location of the receiver device relative to the plurality of feed elements. In doing so, the controller circuit may send an instruction to a power amplifier of the one or more transmitters 110 that causes the power amplifier to feed an RF signal to the selected respective feed elements of the one or more transmitters 110.

FIG. 2 is a schematic of a representative transmitter zone 110 in accordance with some embodiments. The representative transmitter zone 110 is an example of one of the transmitter zones 110-A-110-N (FIG. 1B). The components in FIG. 2 are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

As a non-limiting example, the representative transmitter zone 110 includes a transmitter 300 (which includes an antenna element 202, a plurality of feeds 204-A, 204-B, . . . 204-N, and a power amplifier 206 (or multiple power amplifiers)). The components of the representative transmitter zone 110 are coupled via busing 108 or the components are directly coupled to one another. Additionally, the representative transmitter zone 110 includes switches 208-A, 208-B, . . . 208-N positioned between the power amplifier 206 and each respective feed 204. In some embodiments, instead of using switches to couple a single power amplifier 206 with multiple feeds 204, multiple power amplifiers may each be coupled directly with a single feed 204 (or two power amplifiers may each be coupled with one or more of the feeds via the switching arrangement illustrated in FIG. 2). Other configurations of power amplifiers and feeds are also within the scope of this disclosure, as one of skill will readily appreciate upon reading the descriptions herein.

In some embodiments, the power amplifier(s) 206 and any switches 208 can be configured as part of the transmitter 300 (not illustrated) while, in other embodiments, the power amplifier(s) 206 and any switches 208 can be configured as external to the transmitter 300 and coupled to feeds of an antenna element 202 (as illustrated in FIG. 2). In some embodiments, power amplifiers 206 may be shared across multiple transmitter zones 110.

The antenna element 202 is coupled with the plurality of feeds 204-A, 204-B, . . . 204-N. In some embodiments (as shown in FIG. 3B), the antenna element 202 is directly coupled with each of the feeds 204-A, 204-B, . . . 204-N. The antenna element 202 is used to radiate one or more RF signals that provide wirelessly delivered power to a receiver 120. In some embodiments, the radiated one or more RF signals are received by the receiver 120 when the receiver is located anywhere between a top surface of the transmitter zone 110 and up to a wavelength of an operating frequency of the transmitter 300 away from the transmitter zone 110 (e.g., the receiver 120 is within a mid-field transmission distance of the transmitter 300). In some embodiments, the antenna element 202 is a conductive wire forming a loop antenna (e.g., a substantially contiguous loop antenna). The antenna element 202 may be made from a suitable material that is capable of conducting the RF signals.

Each feed 204 is coupled with the antenna element 202 at a different position (e.g., positions A-D, FIG. 3A) on the antenna element 202. For example, the feed 204-A is coupled with the antenna element 202 at a first position, the feed 204-B is coupled with the antenna 202 at a second position, and so on. Each of the plurality of feeds 204-A, 204-B, . . . 204-N provides the one or more RF signals to be radiated by the antenna element 202 at a particular position along the antenna element 202 (as explained in more detail below). Each feed 204 may be made from any suitable conductive material (e.g., aluminum, copper, etc.).

The power amplifier is used to selectively provide power to one or more of the feeds 204-A, 204-B, . . . 204-N by closing one or more of the switches 208-A, 208-B, . . . 208-N. The power amplifier 206 may be instructed (e.g., by the controller 209) to close a respective switch of the one or more of the switches 208-A, 208-B, ... 208-N depending on a location of the receiver 120 relative to the plurality of feeds 204-A-204-D. Although not shown, the one or more of the switches 208-A, 208-B, ... 208-N may be part of (e.g., internal to) the power amplifier. Operation of the power amplifier is discussed in further detail below with reference to the method 400.

In some embodiments, the power amplifier 206 is coupled with a power supply (not shown), and the power amplifier 206 draws energy from the power supply to provide RF signals to one or more of the feeds 204-A, 204-B, ... 204-N. Moreover, in some embodiments (not shown), the power amplifier 206 is coupled with an RF power transmitter integrated circuit (e.g., the RF integrated circuit may be part of the transmitter zone 110 or more generally part of the transmitter pad 100). The RF integrated circuit is configured to generate a suitable RF signal and provide that RF signal to the power amplifier 206, and the power amplifier 206 in turn provides the RF signal to one or more of the feeds 204-A, 204-B, ... 204-N. In some embodiments, the RF integrated circuit includes an RF oscillator and/or a frequency modulator that is used to generate the RF signal so that is appropriate for transmission to an RF receiver 120 (e.g., the RF signal has an appropriate power level, frequency, etc. to ensure that a maximum amount of energy is transferred from the transmitter 300 to the RF receiver 120).

In some embodiments, the power amplifier 206 is coupled to an internal or external (with respect to the transmitter pad 100) controller 209, and in turn is coupled to the one or more processors 104 (FIG. 1A). In some embodiments, the controller 209 and the one or more processors 104 are not part of a particular transmitter zone 110 (e.g., the controller 209 is an internal component of the transmitter pad 100 overall and is in communication with each of the transmitter zones 110). Alternatively, in some embodiments, respective controllers 209 and respective one or more processors 104 are each internally associated with each of the respective transmitter zones 110. The controller 209 and the one or more processors 104 are configured to control operation of the power amplifier 206. For example, the controller 209 or the one or more processors 104 may select a respective feed of the feed 204-A, 204-B, ... 204-N based on the location of the receiver 120 relative to the feeds 204-A, 204-B, ... 204-N. Further, the controller 209 may send an instruction to the power amplifier 206 that causes the power amplifier 206 to feed one or more RF signals to the respective feed that was selected based on the location of the receiver.

In some embodiments, the controller 209 (or a component thereof, e.g., the one or more processors 104) uses information received by the one or more communication components 112 and/or detected by the one or more transmitter sensors 114 to determine the location of the receiver 120 relative to the feeds 204-A, 204-B, ... 204-N. Determining the location of the receiver 120 is discussed in further detail below with reference to the method 400.

FIGS. 3A-3B illustrate various views of a representative transmitter 300 in accordance with some embodiments. The transmitter 300 is an example wireless power transmitter included in one of the transmitter zones 110 (FIG. 1A and FIG. 2). As shown, the transmitter 300 includes a ground plate 210, an antenna element 202, and a plurality of feeds 204-A-204-D. It is noted that the representative transmitter 300, and its various components, may not be drawn to scale. Moreover, while some example features are illustrated, various other features have not been illustrated for the sake of brevity and so as not to obscure pertinent aspects of the example implementations disclosed herein.

The ground plate defines a plurality of openings 212-A-212-D, where each of the plurality of openings 212-A-212-D is sized to receive and accommodate one of the plurality of feeds 204. The number of openings corresponds to the number of feeds. In some embodiments, the ground plate 210 forms a bottom surface of the transmitter pad 100. The ground plate 210 can be made from various materials as known by those skilled in the art. As explained below, the transmitter 300 can include any number of feeds, depending on the circumstances.

The antenna element 202 is offset from the ground plate (e.g., distance (D), FIG. 3B). In such an arrangement, the ground plate 210 defines a first plane (e.g., a first horizontal plane: the bottom surface) and the antenna element 202 defines a second plane (e.g., a second horizontal plane: the top surface) that is offset from the first plane. A gap is formed between the ground plate 210 and the antenna element 202.

Each of the plurality of feeds 204-A-204-D is disposed in a respective opening of the plurality of openings 212-A-212-D, and each of the feeds 204-A-204-D connects to the antenna element 202 at a different position along the conductive wire 202-A. In such an arrangement, the feeds 204-A-204-D support the antenna element 204 along a length of the antenna element 202. For example, with reference to FIG. 3B, feeds 204-A and 204-B extend through their respective openings 212-A and 212-B to the antenna element 202, and in doing so, structurally support the antenna element 202. Each of the plurality of feeds 204-A-204-D is substantially perpendicular to the ground plate 210 and the antenna element 202 (e.g., each of the plurality of feeds 204-A-204-D is disposed along a respective vertical axis while the conductive plate and antenna element are disposed along respective horizontal axes/planes). Although four feeds are shown in FIG. 3A, the transmitter 300 can include any number of feeds, depending on circumstances (e.g., could be less than or greater than four feeds).

In some embodiments, the antenna element 202 includes a plurality of contiguous segments 202-A-202-D, and each of the plurality of feeds 204-A-204-D is positioned between a respective pair of adjacent segments (e.g., positioned between abutting ends of adjacent segments). For example, a first feed 204-A of the plurality of feeds 204 is positioned between a third segment 202-C and a fourth segment 202-D of the plurality of contiguous segments (i.e., a first respective pair of adjacent segments), a second feed 204-B of the plurality of feeds 204 is positioned between the fourth segment 202-D and a first segment 202-A of the plurality of contiguous segments (i.e., a second respective pair of adjacent segments), and so on. In such an arrangement, each of the plurality of feeds 204-A-204-D is mechanically (and electrically) coupled with two segments.

In some embodiments (not illustrated), a shape of each segment in the plurality of contiguous segments 202-A-202-D is substantially the same (e.g., each is rectangular or some other shape). In some embodiments, a shape of at least one segment in the plurality of contiguous segments 202-A-202-D differs from shapes of other segments in the plurality of contiguous segments 202-A-202-D. For example, segments 202-B and 202-D have a first shape (e.g., a rectangle) and segments 202-A and 202-C have a second shape that differs from the first shape. It is noted that various combinations of shapes can be used to form the contiguous segments of antenna element 202, and the shapes shown in FIG. 3A are merely examples.

FIG. 3B is a cross-sectional view (taken along line A-A¹) of the representative transmitter 300 of FIG. 3A in accordance with some embodiments. Feeds 204-A and 202-B are directly coupled with two segments of the antenna element 202 (although not shown, feeds 204-C and 204-D have the same arrangement). As shown in the magnified view 311, the fourth segment 202-D is directly coupled with the feed 204-B at a first connection point 312 and the first segment 202-A is directly coupled with the feed 204-B at a second connection point 314 (the other feeds are connected to respective segments in an analogous fashion). In such an arrangement, when the power amplifier 206 feeds an RF signal to the feed 204-B, the RF signal travels along the feed 204-B and then travels through the segments 202-A to 202-D of the antenna element 202.

Depending on which one of the feeds 204 is selected to be fed by the power amplifier 206, the antenna element 202 is configured to radiate RF energy with different propagation patterns and concentrations. In some circumstances, a high concentration of the radiated RF energy is created at a mid-field distance from the selected feed(s). In some instances, the "high concentration" of RF energy includes approximately 50 percent of the radiated energy, although greater and lesser percentages can be achieved. For example, with reference to FIG. 5A, when the power amplifier 206 feeds an RF signal to feed 204-C (shown schematically in FIG. 5A), a high concentration of energy radiated by the transmitter 300 is created at a mid-field distance $D^1$ from the antenna 202. A similar result is shown in FIG. 5B for activation of the feed 204-D.

Figure 6A:
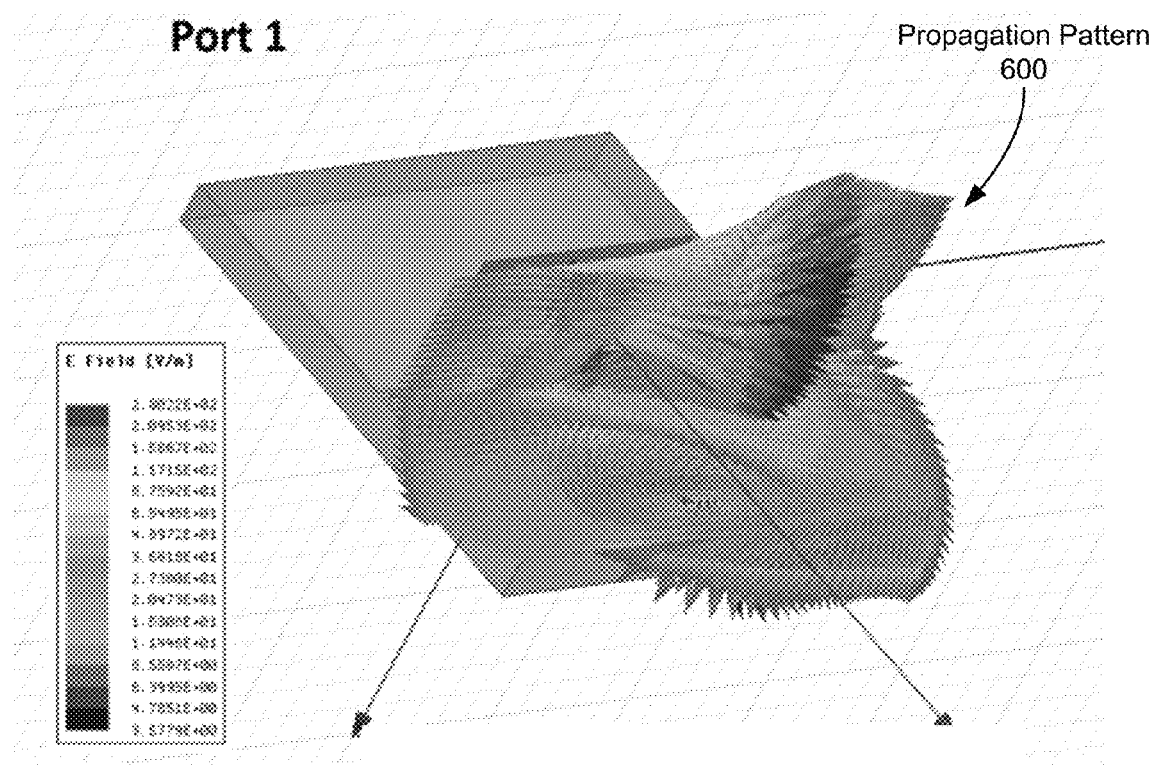
FIGS. 6A-6B show various propagation patterns radiating from a wireless power transmitter in accordance with some embodiments.
Figure 6B:
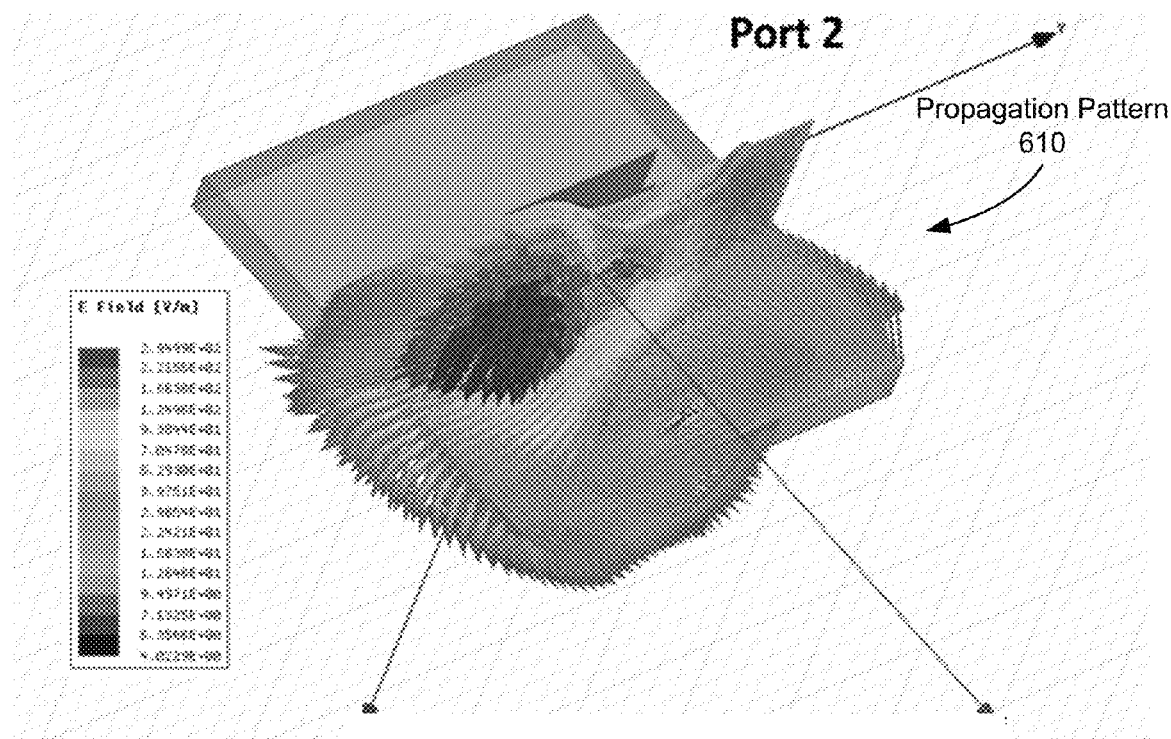

In some embodiments, by activating one of the feeds (e.g., the feed 204-D in the above example), impedance changes may be introduced at each of the feeds that are not activated (e.g., the feeds 204-A, 204-B, and 204-C are not activated in the above example, thereby introducing impedance along the antenna element at respective points where these feeds contact the antenna element 202). The selective activation of different feeds may also help to steer a direction along which the RF energy radiates away from the transmitter 300. For example, as shown in FIG. 6A, when only feed 204-C is activated, then the RF energy radiates away from the transmitter 300 in a substantially right-moving direction (from a viewpoint facing the top surface of the transmitter 300 or a top surface of a transmitter zone 110 in which the transmitter 300 is positioned). As another example, as shown in FIG. 6B, when only feed 204-D is activated, then the RF energy radiates away from the transmitter 300 in a substantially left-moving direction (from a viewpoint facing the top surface of the transmitter 300 or a top surface of a transmitter zone 110 in which the transmitter 300 is positioned). In this way, the transmitter 300 is configured in such a way that radiation of the RF energy may be controlled to ensure that a higher concentration of RF energy reaches a targeted receiver 120 (which may be positioned up to a wavelength away from the transmitter 300 or the transmitter zone 110 in which the transmitter 300 is positioned).

The connection point arrangement illustrated in FIG. 3B is merely one possible arrangement of the antenna element 202 and the feeds 204. In an alternative embodiment, each feed 204-A-204-D may be directly coupled with the antenna element 202 at a single connection point. In this alternative embodiment, the antenna element 202 is not divided into a plurality of contiguous segments but is instead a continuous antenna element 202. Each feed 204-A-204-D, in this alternative embodiment, is only connected to the continuous antenna element 202 at a respective second connection point, and each respective second connection point is at a different position along the conductive wire of the antenna element 202.

As explained in greater detail below with reference to FIG. 4, the antenna element 202 is configured to radiate an RF signal (or multiple RF signals) with different propagation patterns depending on which of the plurality of feed elements 204 is fed by the power amplifier 206 (FIG. 2). In some instances, physical dimensions of the antenna element 202 (and other physical dimensions of the transmitter 300) dictate (or at least partially dictate) the resulting propagation patterns. The physical dimensions include but are not limited to a width (W) of the antenna element 202, a length (L3) of the antenna element 202, a height (L1) of the antenna element 202, a length (L2) of one or more segments of the antenna element 202, a thickness (T) of the antenna element 202, a shape of the antenna element 202, and a magnitude (D) of the offset between the ground plate 210 and the antenna element 202.

In some embodiments, a value for each of the physical dimensions is defined according to a wavelength ($\lambda$) and a frequency of the one or more RF signals to be radiated by the antenna element 202. The transmitter pad 100 can include transmitters 300 that are dimensioned to cause transmission of RF signals at frequencies ranging from one or more of 400 MHz ($\lambda$=0.75 meters) to 60 GHz ($\lambda$=0.005 meters), depending on the application. Accordingly, when operating at a frequency of 900 MHz ($\lambda$=0.333 meters), the width (W) of an example antenna element 202 of a transmitter 300 is approximately 0.005994 meters (i.e., approximately 6 mm), the height (L1) of the example antenna element 202 is approximately 0.0333 meters (i.e., approximately 33 mm), the length (L3) of the example antenna element 202 is approximately 0.11655 meters (i.e., approximately 116.5 mm), a length (L2) of segment 202-B and segment 202-D of the example antenna element 202 is approximately 0.04995 meters (i.e., approximately 50 mm), a magnitude (D) of the offset between the ground plate 210 and the example antenna element 202 is approximately 0.02331 meters (i.e., approximately 23.3 mm), a length ($L_F$) of each feed 204 of the example antenna element 202 is approximately 0.02731 meters (i.e., approximately 27.3 mm). Moreover, a height and a length of the ground plate 210 of the example antenna element 202 can be 0.04995 meters (i.e., approximately 50 mm) and 0.14985 meters (i.e., approximately 150 mm), respectively. In some embodiments, the thickness (T) is either equal to or less than the width (W) of the example antenna element 202. One skilled in the art will appreciate that the dimensions above are merely one example. Various other dimensions are possible, depending on the circumstances.

Method of Operation

FIG. 4 is a flow diagram showing a method of wireless power transmission in accordance with some embodiments. Operations (e.g., steps) of the method 400 may be performed by a controller of a transmitter pad (e.g., controller 209 of transmitter pad 100, FIG. 2), the transmitter pad including one or more transmitter zones (e.g., transmitter zones 110, FIGS. 1A-1B; which each include respective one or more transmitters 300, FIG. 3A). At least some of the operations shown in FIG. 4 correspond to instructions stored in a computer memory or computer-readable storage medium (e.g., memory 106 of the transmitter pad 100, FIG. 1A).

The method 400 includes providing (402) a wireless power transmitter (e.g., transmitter 300, FIG. 3A) including (i) a ground plate (e.g., ground plate 210, FIG. 3A), (ii) a conductive wire (e.g., antenna element 202, FIG. 3A) offset from the ground plate, the conductive wire forming a loop antenna, (iii) a plurality of feed elements (e.g., feeds 204-A-204-D, FIG. 3A) extending from the ground plate to the conductive wire, each feed element being connected to the conductive wire at a different position on the conductive wire (e.g., positions A-D, FIG. 3A), and (iv) a power amplifier (e.g., power amplifier 206, FIG. 2) connected to one or more feed elements of the plurality of feed elements. In some embodiments, the ground plate includes a plurality of openings (e.g., openings 212-A-212-D, FIG. 3A), and each of the plurality of feeds is disposed in a respective opening of the plurality of openings (e.g., as shown in FIGS. 3A and 3B). Structural aspects of the wireless power transmitter are discussed in further detail above with reference to FIGS. 3A and 3B.

In some embodiments, the method 400 further includes selecting (404), by a controller (e.g., controller 209 or a component thereof, such as one or more processors 104, FIG. 2) of the wireless power transmitter, a respective feed element of the one or more feed elements based on a location of a receiver device relative to the plurality of feed elements. For example, with reference to FIG. 3A, if the receiver device is located nearest feed element 204-A relative to the other feed elements 204-B-204-D, then the controller selects the feed element 204-A. In some circumstances, the receiver device is located between two or more of the plurality of feed elements. In such circumstances, the method 400 may include selecting, by the controller, at least two feed elements based on a location of the receiver device relative to the plurality of feed elements. Further, the controller may select all of the plurality of feed elements in some instances.

In some embodiments, the method 400 further includes sending (406), by the controller, an instruction to the power amplifier that causes the power amplifier to feed the RF signal to the respective feed element. For example, with reference to FIG. 2, if the respective feed element is feed 204-A, then the controller 209 sends an instruction (e.g., via busing 108) that causes the power amplifier to close the switch 208-A, and in turn feed the RF signal to the feed 204-A.

In some embodiments, the wireless power transmitter includes a communications radio (e.g., communications component 112, FIG. 1A), and the method 400 further includes receiving a communications signal from a corresponding communications radio of the receiver device. Further, the controller (or a component thereof) may determine the location of the receiver device relative to the plurality of feed elements based on the communications signal (e.g., using information included with or indicated by the communications signal). In some embodiments, the receiving and the determining are performed prior to the selecting (404) and the sending (406). In some embodiments, the controller determines the location of the receiver device relative to the plurality of feed elements based on signal strength of the communication signal, triangulation, and/or response time (e.g., the receiver device timestamps the communication signal when sent which is then compared against a timestamp of the communication signal when it is received at the wireless power transmitter). Additional location determining techniques can also be used.

In some embodiments, the wireless power transmitter includes one or more sensors (e.g., transmitter sensors 114, FIG. 1A), and the method 400 further includes detecting, via the one or more sensors, a presence of the receiver device. Further, the controller (or a component thereof) may determine the location of the receiver device relative to the plurality of feed elements based on information generated by the one or more sensors. In some embodiments, the detecting and the determining are performed prior to the selecting (404) and the sending (406). In some embodiments, the one or more sensors include one or more of a pressure sensor, an infrared sensor, an electromagnetic sensor, an acoustic sensor, a capacitive sensor, a light sensor, an inductive sensor, and a hall sensor. As an example, a light sensor may detect a change in light near the wireless power transmitter when the receiver device is positioned on or proximate to the wireless power transmitter. In another example (in addition to or separated from the previous example), an infrared sensor may detect a change in temperature near the wireless power transmitter when the receiver device is positioned on or proximate to the wireless power transmitter. In some embodiments, information collected from multiple sensors can be used to determine the location of the receiver device.

In some embodiments, each of the plurality of feeds is associated with a respective sensor (e.g., the respective sensor is positioned near (or perhaps on) the feed and the respective sensor takes readings near the feed). In this way, readings from each of the sensors can be compared (e.g., by the one or more processors 104), and the controller may determine the location of the receiver device relative to the plurality of feed elements based on the comparing. For example, if a largest change in light occurs at feed 204-A relative to changes in light occurring at the other feeds, then the controller can determine that the receiver device is located closest to the feed 204-A.

In some embodiments, the controller determines the location of the receiver device relative to the plurality of feed elements using two or more forms of information (e.g., signal strength in combination with a thermal imaging data, or some other combination communications-based and sensor-based information).

The method 400 further includes selectively feeding (408), by the power amplifier, an RF signal to the respective feed element of the one or more feed elements based on the location of a receiver device relative to the plurality of feed elements. For example, with reference to FIG. 3A, a first feed element 204-A of the one or more feed elements 202-A-202-D is connected to the conductive wire 202 at a first position (e.g., position A) and a second feed element 202-B, distinct from the first feed element 202-A, of the one or more feed elements 202-A-202-D is connected to the conductive wire 202 at a second position (e.g., position B). In such a configuration, the power amplifier: (i) may feed the RF signal to the first feed element when the location of the receiver device is within a threshold distance from the first position, and (ii) may feed the RF signal to the second feed element when the location of the receiver device is within the threshold distance from the second position. In some embodiments, feeding the RF signal to the one or more feed elements includes feeding the RF signal to two of the plurality of feed elements upon determining that the location of the receiver device is between the two feed elements.

In some embodiments, the selective-feeding operation (408) is performed in response to the power amplifier receiving the instruction from the controller.

The method 400 further includes (i) exciting (410), by the respective feed element fed by the power amplifier, the conductive wire and then (ii) radiating (412), by the conductive wire, the RF signal for wirelessly powering the receiver device. The conductive wire may radiate the RF signal from the conductive wire with different propagation patterns depending on which of the plurality of feed elements is fed by the power amplifier. For example, the conductive wire radiates the RF signal from the conductive wire in a first propagation pattern of the different propagation patterns when a first feed element of the one or more feed elements is fed by the power amplifier. In this example, a high concentration of radiated RF energy in the first propagation pattern is created at a mid-field distance away from the feed 204-C. In some instances, the "high concentration" of RF energy includes approximately 50 percent of the radiated energy, although greater and lesser percentages can be achieved. Also, a concentration of RF energy in the first propagation pattern forms around the first feed element and the first propagation pattern propagates away from the first feed element in a first direction (or a set of first directions) towards the location of the receiver device. To illustrate, with reference to FIG. 5A, a high concentration of radiated RF energy 504 is created at a mid-field distance (e.g., distance $D^1$) away from the feed 204-C. Moreover, with reference to FIG. 6A, the resulting propagation pattern 600 of RF energy from feeding the RF signal to the feed 204-C moves substantially rightward to cause the RF energy to travel towards the location of a receiver device, which in this example would be positioned at the mid-field distance. In this way, the method 400 allows for selectively activating individual feed elements of a loop antenna to ensure that RF energy is propagated in such a way that a sufficiently high concentration of the RF energy is optimally propagated towards a location of a receiver device.

In another example, the conductive wire may radiate the RF signal in a second propagation pattern of the different propagation patterns when a second feed element of the one or more feed elements is fed by the power amplifier. In this example, a high concentration of RF energy in the second propagation pattern is created at a mid-field distance away from the feed 204-D. Also, a concentration of RF energy in the second propagation pattern forms around the second feed element and the second propagation pattern propagates away from the second feed element in a second direction (or a set of second directions) towards a location of the receiver device. To illustrate, with reference to FIG. 5B, a high concentration of RF energy 514 is created at a mid-field distance away from the feed 204-D (e.g., distance $D^2$). Moreover, with reference to FIG. 6B, the resulting propagation pattern 610 from feeding the RF signal to the feed 204-D causes movement of the RF energy in a substantially leftward direction to cause the RF energy to travel towards a second location of the receiver device, which in this example would be positioned at the mid-field distance.

In some embodiments, the wireless power transmitter is configured such that in use the first propagation pattern has a first polarization and the second propagation pattern has a second polarization. In some embodiments, the second polarization differs from the first polarization.

In some embodiments, the different propagation patterns are based, at least in part, on a plurality of physical dimensions of the wireless power transmitter. The plurality of physical dimensions may include but is not limited to: (i) a width of the conductive wire (e.g., width (W), FIG. 3A), (ii) a length of the conductive wire (e.g., length (L3), FIG. 3A), (iii) a height of the conductive wire (e.g., height (L1), FIG. 3A), (iv) a thickness of the conductive wire (e.g., thickness (T), FIG. 3B), (v) a shape of the loop, and (vi) a magnitude of the offset between the ground plate and the conductive wire (e.g., offset (D), FIG. 3B). Physical characteristics of the conductive wire (e.g., the antenna element 202) are discussed in further detail above with reference to FIGS. 3A and 3B.

In some embodiments, the conductive wire includes a plurality of contiguous segments (e.g., segments 202-A-202-D, FIG. 3A), and each of the plurality of feed elements is positioned between a respective pair of adjacent segments of the plurality of contiguous segments (e.g., feed 204-A is positioned between segments 202-C and 202-D). Further, in some embodiments, one or more first segments of the plurality of contiguous segments have a first shape and one or more second segments of the plurality of contiguous segments have a second shape different from the first shape. In some embodiments, each of the plurality of contiguous segments radiates the RF signal when one of the plurality of feed elements is fed by the power amplifier. The plurality of contiguous segments is discussed in greater detail above with reference to FIGS. 3A-3B.

Figure 5A:
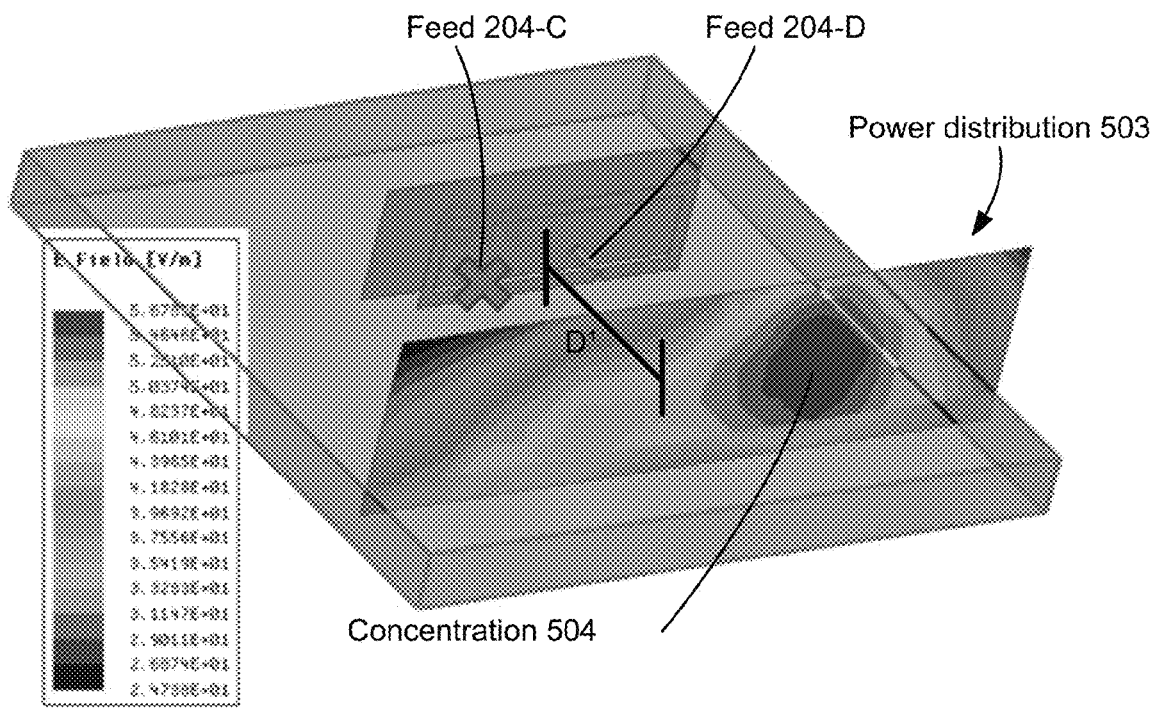
FIGS. 5A-5B show various power distributions from a wireless power transmitter in accordance with some embodiments.
Figure 5B:
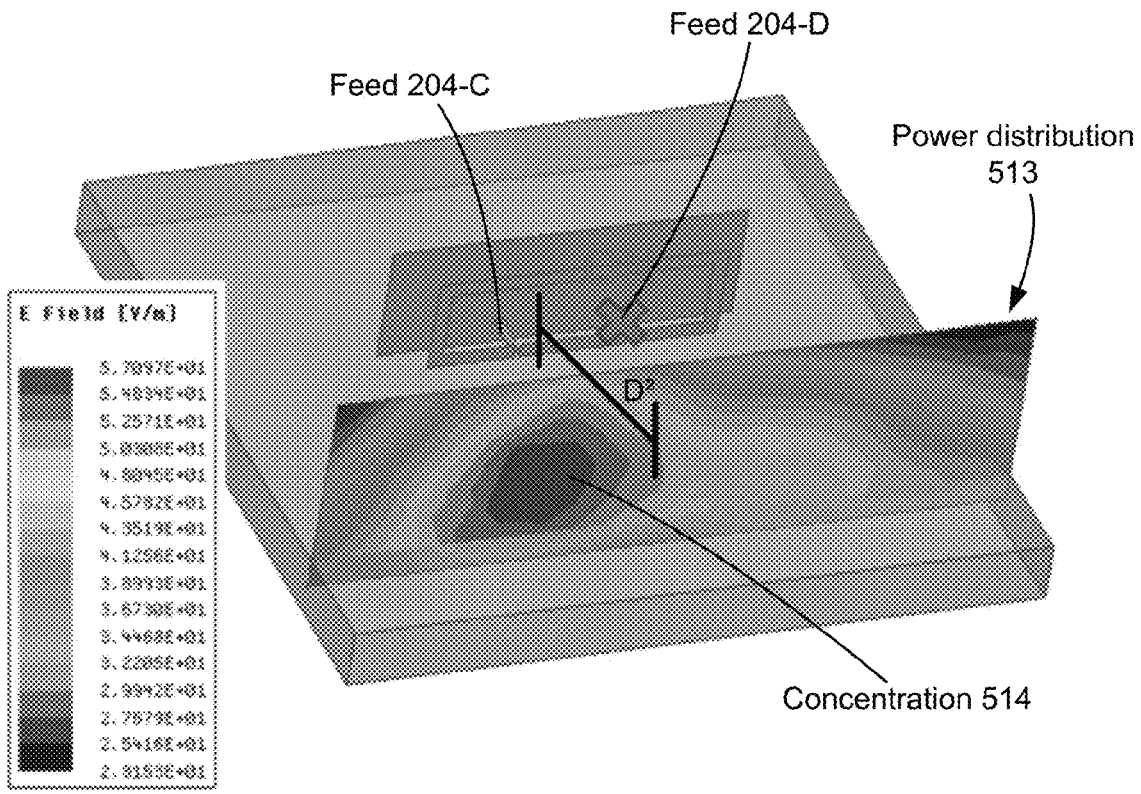

FIGS. 5A-5B show various power distributions from a transmitter (e.g., transmitter 300, FIG. 3A) in accordance with some embodiments. In FIG. 5A, when a feed 204-C is activated (e.g., fed by the power amplifier 206), the feed 204-C excites the antenna element 202 and the antenna element 202 radiates an RF signal having the illustrated power distribution 503. The power distribution 503 illustrates concentrations of the RF signal at a mid-field distance ($D^1$) from the antenna element 202. As shown, the RF signal has a high concentration 504 at the mid-field distance ($D^1$) from the antenna element 202 (and more particularly, the feed 204-C). In FIG. 5B, when a feed 204-D is activated (e.g., fed by the power amplifier 206), the feed 204-D excites the antenna element 202 and the antenna element 202 radiates an RF signal having the illustrated power distribution 513. As illustrated in the power distribution 513, the RF signal has a high concentration 514 at a mid-field distance ($D^2$) from the antenna element 202 (and more particularly, the feed 204-D). In some instances, a "high concentration" includes approximately 50 percent of the radiated RF energy.

FIGS. 6A-6B show various propagation patterns 600 and 610 radiating from a transmitter in accordance with some embodiments. The propagation patterns 600 and 610 shown in FIGS. 6A-6B correspond to the power distributions shown and described in FIGS. 5A-5B. For example, the propagation pattern 600 results from the feed 204-C being activated and the propagation pattern 610 results from the feed 204-D being activated. As described above with reference to the method 400, the transmitter is configured such that a concentration of RF energy in a first propagation pattern may propagate in a first direction (or a first set of directions) and a concentration of RF energy in a second propagation pattern may propagate in a second direction (or a second set of directions). For example, the propagation pattern 600 points substantially to the right, at least for portions of the propagation pattern 600 having a high concentration of RF energy, whereas the propagation pattern 610 points substantially to the left, at least for portions of the propagation pattern 610 having a high concentration of RF energy. Accordingly, when a receiver 120 is positioned, e.g., to the right of the transmitter, and is within a predefined distance from the transmitter (e.g., within a mid-field distance from the transmitter), the transmitter can selectively activate one of its feeds to direct RF energy to the right of the transmitter.

In some embodiments, the transmitter dynamically adjusts a shape and/or direction of the propagation patterns 600 and 610 by changing one or more characteristics of the RF signal. For example, the one or more characteristics may include but are not limited to frequency, gain, amplitude, and phase. In doing so, with reference to the propagation pattern 600, the transmitter may adjust one or more of the one or more characteristics so that the propagation pattern 600 points more right or less right (or perhaps more up or down, or a combination thereof). The transmitter may adjust the shape and/or direction of a propagation pattern depending on a location of the receiver 120 relative to the one or more feeds of the transmitter. Additionally, the physical dimensions of the transmitter impact the resulting propagation patterns 600 and 610 (e.g., an antenna element having a first width (W) may tend to create a first propagation pattern and an antenna element having a second width (W) may tend to create a second propagation pattern different from the first propagation pattern). The various other dimensions discussed above with reference to FIGS. 3A-3B may also impact the resulting propagation patterns 600 and 610.

Method of Fabrication

A method of fabricating a wireless power transmitter (e.g., transmitter 300, FIG. 3A) includes providing a ground plate (e.g., ground plate 210, FIG. 3A) and removing material from the ground plate to define one or more openings (e.g., holes) in the ground plate (e.g., openings 212-A-212-D). The one or more openings being sized to receive feed elements (e.g., feeds 204-A-204-D). In some embodiments, the removing is performed using a drilling operation. The method further includes disposing/attaching a feed in each of the one or more openings such that the wireless power transmitter includes one or more feeds. In some embodiments, each of the feeds is mechanically and/or chemically (e.g., using an adhesive) attached to its respective opening. The one or more feeds are substantially perpendicular to the ground plate and extend away from the ground plate, as shown in FIG. 3B. The method further includes attaching an antenna element (e.g., antenna element 202) to the one or more feeds. In some embodiments, the antenna element is mechanically and/or chemically attached to the feeds. Connection points between the antenna element and feed elements are discussed in further detail above with reference to FIG. 3B. The antenna element may be offset from the ground plate by a distance (e.g., magnitude (D) of the offset, FIG. 3B). In some embodiments, the antenna element is substantially parallel to the ground plate.

In some embodiments, one or more wireless power transmitters are fabricated using the method above, and grouped together to form a transmission pad 100 (i.e., an array of wireless power transmitters). In some embodiments, the ground plate may be a single ground plate used by the one or more wireless power transmitters. Alternatively, in some embodiments, each of the one or more wireless power transmitters has a distinct ground plate. An array of wireless power transmitters may be formed by positioning each of the wireless power transmitters within respective transmitter zones, and then interconnecting components of each of the transmitter zones with a common controller for the transmitter pad.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A wireless power transmitter, comprising:
   a ground plate;
   a conductive wire offset from the ground plate, the conductive wire forming a loop antenna that is configured to radiate an RF signal for wirelessly powering a receiver device;
   a plurality of feed elements extending from the ground plate to the conductive wire, wherein each feed element is connected to the conductive wire at a different position on the conductive wire; and
   a power amplifier connected to one or more feed elements of the plurality of feed elements, the power amplifier being configured to selectively feed the RF signal to a respective feed element of the one or more feed elements based on a location of the receiver device relative to the plurality of feed elements.

2. The wireless power transmitter of claim 1, further comprising a controller configured to:
   select the respective feed element of the one or more feed elements based on the location of the receiver device relative to the plurality of feed elements; and
   send an instruction to the power amplifier that causes the power amplifier to feed the RF signal to the respective feed element.

3. The wireless power transmitter of claim 2, further comprising a communications radio configured to receive a communications signal from a corresponding communications radio of the receiver device,
   wherein the controller is further configured to determine the location of the receiver device relative to the plurality of feed elements based on the communications signal.

4. The wireless power transmitter of claim 2, further comprising a sensor configured to detect a presence of the receiver device,
   wherein the controller is further configured to determine the location of the receiver device relative to the plurality of feed elements based on information generated by the sensor.

5. The wireless power transmitter of claim 1, wherein the conductive wire is configured to radiate the RF signal from the conductive wire with different propagation patterns depending on which of the plurality of feed elements is fed by the power amplifier.

6. The wireless power transmitter of claim 5, wherein the conductive wire is configured to radiate the RF signal from the conductive wire with the different propagation patterns based on a plurality of physical dimensions of the wireless power transmitter, including:

a width of the conductive wire;
a length of the conductive wire;
a height of the conductive wire;
a thickness of the conductive wire;
a shape of the loop; and
a magnitude of the offset between the ground plate and the conductive wire.

7. The wireless power transmitter of claim 5, wherein:
when the respective feed element is a first feed element of the one or more feed elements that is connected to the conductive wire at a first position, the power amplifier is further configured to feed the RF signal to the first feed element when the location of the receiver device is within a first threshold distance from the first position.

8. The wireless power transmitter of claim 7, wherein:
the conductive wire is configured to radiate the RF signal from the conductive wire in a first propagation pattern of the different propagation patterns when the first feed element of the one or more feed elements is fed by the power amplifier,
where a high concentration of RF energy in the first propagation pattern is steered to travel towards the location of the receiver device.

9. The wireless power transmitter of claim 8, wherein:
when the respective feed element is a second feed element, distinct from the first feed element, of the one or more feed elements that is connected to the conductive wire at a second position distinct from the first position, the power amplifier is further configured to feed the RF signal to the second feed element when the receiver device is located at a second location, distinct from the location, the second location being within a second threshold distance from the second position.

10. The wireless power transmitter of claim 9, wherein:
the conductive wire is configured to radiate the RF signal in a second propagation pattern of the different propagation patterns when the second feed element of the one or more feed elements is fed by the power amplifier,
where a high concentration of RF energy in the second propagation pattern is steered to travel towards the second location of the receiver device.

11. The wireless power transmitter of claim 10, wherein the wireless power transmitter is configured such that in use:
the RF signal radiated in the first propagation pattern propagates away from the first position in a first direction towards the location of the receiver device;
the RF signal radiated in the second propagation pattern propagates away from the second position in a second direction towards the second location of the receiver device; and
the second direction is different from the first direction.

12. The wireless power transmitter of claim 11, wherein the wireless power transmitter is configured such that in use:
the first propagation pattern has a first polarization;
the second propagation pattern has a second polarization; and
the second polarization differs from the first polarization.

13. The wireless power transmitter of claim 1, wherein:
the ground plate is disposed in a first plane;
the conductive wire is disposed in a second plane; and
the second plane is substantially parallel to the first plane.

14. The wireless power transmitter of claim 13, wherein the second plane is offset from the first plane by a distance.

15. The wireless power transmitter of claim 13, wherein each of the plurality of feed elements is substantially perpendicular to the first and second planes.

16. The wireless power transmitter of claim 1, wherein:
the conductive wire comprises a plurality of contiguous segments; and
each of the plurality of feed elements is positioned between a respective pair of segments of the plurality of contiguous segments.

17. The wireless power transmitter of claim 16, wherein:
one or more first segments of the plurality of contiguous segments have a first shape; and
one or more second segments of the plurality of contiguous segments have a second shape different from the first shape.

18. The wireless power transmitter of claim 16, wherein each of the plurality of contiguous segments is configured to radiate the RF signal when one of the plurality of feed elements is fed by the power amplifier.

19. A method of wirelessly charging a receiver device, the method comprising:
providing a wireless power transmitter comprising:
a ground plate;
a conductive wire offset from the ground plate, the conductive wire forming a loop antenna;
a plurality of feed elements extending from the ground plate to the conductive wire, each feed element being connected to the conductive wire at a different position on the conductive wire; and
a power amplifier connected to one or more feed elements of the plurality of feed elements;
selectively feeding, by the power amplifier, an RF signal to a respective feed element of the one or more feed elements based on a location of a receiver device relative to the plurality of feed elements;
exciting, by the respective feed element fed by the power amplifier, the conductive wire; and
radiating, by the conductive wire, the RF signal for wirelessly powering the receiver device.

20. A transmitter pad comprising:
a plurality of a wireless power transmitters, wherein each of the plurality of a wireless power transmitters comprises
a ground plate;
a conductive wire offset from the ground plate, the conductive wire forming a loop antenna that is configured to radiate an RF signal for wirelessly powering a receiver device;
a plurality of feed elements extending from the ground plate to the conductive wire, wherein each feed element is connected to the conductive wire at a different position on the conductive wire; and
a power amplifier connected to one or more feed elements of the plurality of feed elements, the power amplifier being configured to selectively feed the RF signal to the one or more feed elements based on a location of the receiver device relative to the plurality of feed elements.

* * * * *